United States Patent [19]
Fergason

[11] Patent Number: 4,953,953
[45] Date of Patent: Sep. 4, 1990

[54] COMPLEMENTARY COLOR LIQUID DISPLAY

[75] Inventor: James L. Fergason, Atherton, Calif.

[73] Assignee: Manchester R & D Partnership, Pepper Pike, Ohio

[21] Appl. No.: 456,060

[22] Filed: Dec. 21, 1989

Related U.S. Application Data

[63] Continuation of Ser. No. 358,574, May 26, 1989, which is a continuation of Ser. No. 942,517, Dec. 16, 1986, Pat. No. 4,834,508, which is a continuation-in-part of Ser. No. 707,486, Mar. 1, 1985, abandoned.

[51] Int. Cl.$^5$ .............................................. G02F 1/13
[52] U.S. Cl. ............................... 350/339 F; 350/334; 350/335; 350/349; 350/408
[58] Field of Search ............ 350/334, 335, 349, 339 F, 350/408

[56] References Cited

U.S. PATENT DOCUMENTS

| | | | |
|---|---|---|---|
| 2,777,011 | 1/1957 | Marks | 350/335 |
| 2,897,544 | 8/1959 | Marks | 350/339 F |
| 3,300,436 | 1/1967 | Marks et al. | 350/337 |
| 3,322,485 | 5/1967 | Williams | 350/336 |
| 3,600,060 | 8/1971 | Churchill et al. | 350/339 F |

(List continued on next page.)

FOREIGN PATENT DOCUMENTS

| | | |
|---|---|---|
| 0157489 | 10/1985 | European Pat. Off. |
| 2139537 | 1/1975 | France |
| 5245894 | 1/1977 | Japan |
| 5334496 | 3/1978 | Japan |
| 5334542 | 3/1978 | Japan |
| 57192928 | 11/1982 | Japan |
| 2003290 | 3/1979 | United Kingdom |

OTHER PUBLICATIONS

Urisu et al. "Liquid Crystal Display Device for Total Reflection Switching with Fluorescent Dye Addition" Appl. Optics, vol. 20, No. 4, pp. 633–635, Feb. 15, 1981.
Bucher et al. "Frequency-Addressed Liquid Crystal Field Effect", Appl. Phys. Lett., vol. 25, No. 4, Aug. 15, 1974, pp. 186–188.
Sato et al. "Multicolor Fluorescent Liquid Crystal Display Concepts", Appl. Phys. Lett., vol. 37, No. 8, Oct. 15, 1980, pp. 677–679.
Gerber, "Two Frequency Addressing of a Cholesteric Texture Change Electro-Optical Effect", Appl. Phys. Lett., vol. 44, No. 9, May 1, 1984, pp. 932–934.
Suzuki et al., "A Multiplexed Phas-Change-Type Color LCD", IEEE, vol. 22, No. 4, 1981, pp. 293–297.
White et al., "New Absorptive Made Reflective Liquid Crystal Display Device", J. Appl. Phys., vol. 45, No. 11, Nov. 1974, pp. 4718–4723.
Doorn et al., "Two Frequency 100-Line Addressing of a Reflective Twisted-Nematic Liquid Crystal Matrix Display", J. Appl. Phys., vol. 50, No. 2, Feb. 1979, pp. 1066–1070.
RCA, "High Resolution Cathode Ray Tubes" RCA Brochure DD–101, Nov. 1984.

Primary Examiner—Stanley D. Miller
Assistant Examiner—Huy K. Mai
Attorney, Agent, or Firm—Renner, Otto, Boisselle & Sklar

[57] ABSTRACT

A liquid crystal color device (10) includes at least one pel (14) for affecting light (36) incident thereon to produce output light (38), the pel includes three complementary color subsets (30, 32, 34) each having controllable color filtering capability in the respective complementary colors thereof. The color subsets are arranged in optical additive relation, and the color subsets include complementary color parts (30a, 30b, 32a, 32b, 34a, 34b) which are arranged, respectively, in optical serial/subtractive relation. The color filtering function is carried out using liquid crystal materials with respective pleochroic dyes. A method of parametric color control of a liquid crystal device, formed of plural picture elements, each picture element including plural pairs of complementary color filters, comprising directing light to or through an array of such electrically controllable pairs of complementary color filters, and controlling the filtering characteristics of at least one of such filters.

16 Claims, 4 Drawing Sheets

U.S. PATENT DOCUMENTS

| | | | |
|---|---|---|---|
| 3,627,924 | 12/1971 | Fleming et al. | 350/333 |
| 3,636,244 | 1/1972 | Smierciak et al. | 358/17 |
| 3,639,685 | 2/1972 | Morio | 74/831 |
| 3,703,329 | 11/1972 | Castellano | 350/335 |
| 3,720,623 | 3/1973 | Cartmell et al. | 350/350 R X |
| 3,840,695 | 10/1974 | Fischer | 350/339 F |
| 3,864,022 | 2/1975 | Moriyama et al. | 350/349 |
| 4,009,934 | 3/1977 | Goodwin et al. | 350/346 |
| 4,035,690 | 7/1977 | Roeber | 315/169 |
| 4,048,358 | 9/1977 | Shanks | 350/349 |
| 4,211,473 | 7/1980 | Shanks | 350/337 |
| 4,241,339 | 12/1980 | Ushiyama | 350/335 X |
| 4,391,491 | 7/1983 | Freer et al. | 350/341 |
| 4,396,251 | 8/1983 | Mukoh et al. | 350/349 |
| 4,401,537 | 8/1983 | Chern et al. | 204/159.11 |
| 4,414,131 | 11/1983 | Sethofer et al. | 350/349 |
| 4,435,047 | 3/1984 | Fergason | 350/334 |
| 4,448,490 | 5/1984 | Shibuya et al. | 350/335 |
| 4,460,248 | 7/1984 | Shirai | 350/335 |
| 4,470,668 | 9/1984 | Inoue et al. | 350/343 |
| 4,485,376 | 11/1984 | Noble | 350/335 |
| 4,493,532 | 1/1985 | Kaneko et al. | 350/349 |
| 4,556,289 | 12/1985 | Fergason | 350/350 R |
| 4,579,423 | 4/1986 | Fergason | 350/334 |
| 4,581,608 | 4/1986 | Aftergut et al. | 340/784 |
| 4,596,445 | 6/1986 | Fergason | 350/339 F |
| 4,606,611 | 8/1986 | Fergason | 350/334 |
| 4,610,509 | 9/1986 | Sorimachi et al. | 350/339 F |
| 4,613,207 | 9/1986 | Fergason | 350/331 R |
| 4,616,903 | 10/1986 | Fergason | 350/334 |
| 4,643,528 | 2/1989 | Bell, Jr. | 350/334 |
| 4,834,508 | 5/1989 | Fergason | 350/339 F |

COMPLEMENTARY COLOR LIQUID DISPLAY

RELATED CASE

This is a continuation of co-pending application Ser. No. 07/358,574 filed on May 26, 1989, which is a continuation of co-pending application of Ser. No. 942,517 filed on Dec. 16, 1986, now Pat. No. 4,854,908, which is a continuation-in-part of U.S. patent application Ser. No. 707,486, filed Mar. 1, 1985, now abandoned.

CROSS REFERENCES TO RELATED PATENTS

Reference is made to applicant's U.S. Pat. No. 4,435,047, 4,579,423, 4,606,611, 4,596,445, and 4,556,289, the entire disclosures of which hereby are incorporated by reference.

Reference also is made to applicants concurrently filed patent application Ser. No. 942,548 filed Dec. 16, 1986, Pat. No. 4,878,741 entitled "Liquid Crystal Color Display And Method", the entire disclosure of which hereby is incorporated by reference.

Reference is made, too, to copending commonly assigned U.S. patent applications Ser. No. 477,242, filed Mar. 21, 1983, for "Encapsulated Liquid Crystal And Method", Ser. No. 480,461, for "Colored Encapsulated Liquid Crystal Devices Using Imbibition Of Colored Dyes And Scanned Multicolored Displays", filed Mar. 30, 1983, Ser. No. 585,883, filed Mar. 2, 1984, for "Encapsulated Liquid Crystal Material, Apparatus And Method", and Ser. No. 608,135, filed May 8, 1984, for "Liquid Crystal Projector And Method". The entire disclosures of such patents and applications are hereby incorporated by reference.

TECHNICAL FIELD

The invention relates generally, as indicated, to liquid crystal color displays and, more particularly, to use of complementary color techniques in liquid crystal color displays.

BACKGROUND

Generally, background of the invention is presented in the above-mentioned patent(s) and applications. According to the invention a color output is produced using liquid crystal material.

Prior devices using liquid crystal have achieved color output capability. One such device uses twisted nematic liquid crystal material and pleochroic dye to control color filtering of light; such device has been used in a relatively small, e.g. hand held, television display device.

Polarizers are needed for operation of twisted nematic liquid crystal displays, though, and this need is disadvantageous. For example, a polarizer will reduce the amount of transmitted light and, therefore, the overall brightness of the display using the same. The intensity of white output light produced by a twisted nematic liquid crystal display, relying on additive red, green and blue picture elements (analagous to color dots of a color television), will be no greater than about one sixth the intensity of the incident light. The brightness of color light output by the twisted nematic liquid crystal color display also is appreciably smaller than the intensity of the incident light due to the light blocking of a polarizer. Another disadvantage of polarizers in liquid crystal color displays is the color shift that can be caused by a polarizer which will affect the accuracy of the produced color output.

As is described in further detail below, the present invention uses the principles of the nematic curvilinear aligned phase (NCAP) liquid crystal material, which is described in the above-referenced U.S. Patents. Although such NCAP liquid crystal material preferably is of the operationally nematic type, it will be appreciated that other types of liquid crystal material, such as smectic and/or combinations of two or more of the several types of liquid crystal material may be used in the context of the invention as long as such liquid crystal material generally follows the described operationally guidelines to achieve controlled light filtering or coloring in response to a prescribed input.

Such NCAP liquid crystal material is, for example, the combination of operationally nematic liquid crystal material and a surface means that distorts the natural structure of the liquid crystal in the absence of a prescribed input to cause the scattering of light or when pleochroic dye is contained in the liquid crystal material to cause absorption of light. The amount of such scattering or absorption is reduced when a prescribed input, such as an electric field or a magnetic field, is applied to the NCAP liquid crystal material. The color of light absorbed or the color transmitted is a function of the particular color of the pleochroic dye contained in the liquid crystal.

According to a preferred form of the invention, the liquid crystal material is in volumes formed in a containment medium. Such liquid crystal contained in volumes is the preferred NCAP liquid crystal material. The interior wall(s) of the containment medium volumes tend to distort the natural structure of the liquid crystal material to achieve the desired scattering or absorption.

As is well known, there are three main types of liquid crystal material, which include nematic, cholesteric, and smectic.

The present invention preferably uses operationally nematic liquid crystal. One definition of operationally nematic is the liquid crystal is nematic liquid crystal or operates like nematic liquid crystal. Another definition of operationally nematic liquid crystal is a liquid crystal characterized such that in the absence of external fields structural distortion of the liquid crystal is dominated by the orientation of the liquid crystal at its boundaries rather than by bulk effects, such as very strong twists, as in cholesteric material, or layering, as in smectic material. The operationally nematic material may include a mixture of nematic and cholesteric materials; for example, operationally nematic liquid crystal with chiral ingredients, which induce a tendency to twist but cannot overcome the effects of boundary alignment, still would be operationally nematic. Also, for example, a type of smectic material that fits the operational criteria specified may be considered as operationally nematic. Use of operationally nematic liquid crystal enables operational response as a function of electrical input and also enables relatively expeditious and efficient operation, for example in response to the application or removal of an electric field.

Although the present invention preferably employs operationally nematic liquid crystal material, it will be appreciated that the invention may be used with other types of liquid crystal materials than those of the operationally nematic type if such materials function satisfactorily to achieve the described operation of the invention set forth in further detail below. Throughout the following description, though, for convenience, the liquid crystal of the invention may be referred to as nematic or operationally nematic.

Generally a volume of liquid crystal means a quantity of liquid crystal material in a containment medium. The volume of liquid crystal may be a discrete volume, such as a generally curved or, more specifically, spherical, capsule or capsule-like volume bounded on the outside by the containment medium and containing the liquid crystal material within the interior space of the volume. The volume of liquid crystal may be a shape other than spherical. The shape of the interior space (in which the liquid crystal is contained or is confined) within the containment medium may be the same or different shape relative to the shape of the exterior of the containment medium. The volume of liquid crystal may be connected to one or more other volumes of liquid crystal, for example by interconnecting passageways between the interior liquid crystal portions of plural volumes of liquid crystal, by connections of the walls of the containment medium of respective volumes of liquid crystal, or by both. The terms volume, capsule, cell, etc. may be used interchangeably and equivalently herein.

The volume of liquid crystal may be or may be formed or derived from an emulsion, matrix, dispersion, or the like of liquid crystal material and a containment medium or of liquid crystal material in a containment medium. The volume of liquid crystal may be a cell or a cell-like area within a containment medium.

A wall or surface of the containment medium that interfaces with the liquid crystal material is intended to cooperate with the liquid crystal material to distort the liquid crystal structure to a curvilinear alignment form in the absence of a prescribed input, such as an electric field. Such distorted or curvilinear alignment will cause the volume of liquid crystal as well as the pleochroic dye therewith to have a particular optical response or effect on light incident thereon; and in response to a prescribed input, such response can be altered or controlled. Specifically, in the absence of a prescribed input, the distorted curvilinearly aligned liquid crystal material and pleochroic dye contained therein will have a maximum light absorbing or color filtering effect; and in response to such prescribed input (such as an electric field with or without certain frequency characteristics) the amount of such light absorbing or color filtering can be reduced. Also, the prescribed input may include a frequency characteristic to which the liquid crystal may respond to alter or not the alignment characteristics and, thus, the color filtering characteristics.

The prescribed input to which the liquid crystal material of the invention may respond preferably is an electric field; and such response generally is described in detail in the above-referenced patents and/or applications. The electric field may be derived by applying a voltage across a pair of electrodes on opposite sides of the liquid crystal material. The electric field may be alternating current type or direct current type, although the former is preferred. The liquid crystal material is responsive to the magnitude of such electric field to overcome the distortion caused by the surface of the containment medium, and, thus, to align with repsect to the field, generally in proportion to the magnitude of the field. Moreover, the liquid crystal material may be frequency responsive, and in such case the liquid crystal alignment may be a function of both the magnitude and frequency of the applied field. Furthermore, although preferably the prescribed input is an electric field (and will be referred to below interchangeably as prescribed input and electric field), it will be appreciated that the prescribed input may be a magnetic field or other input that is capable of causing the desired operational response according to the invention.

Usually liquid crystal material is anisotropic. One example is optical anisotropy, which is the characteristic of birefringence. A birefringent liquid crystal may have one index of refraction characteristic (ordinary index of refraction) when looking along the axis of the liquid crystal and a different index of refraction characteristic (extraordinary index of refraction) when looking across the axis of the liquid crystal. Another example is electrical anisotropy; liquid crystal, especially nematic liquid crystal, may have positive or negative dielectric anisotropy. Moreover, some liquid crystal materials are referred to as cross over liquid crystal because they may have both positive and negative dielectric anisotropy; and the particular polarity thereof is a function of the frequency of applied electric field. As is described further below, the preferred liquid crystal material of the invention has positive dielectric anisotropy or is of the cross over type.

Pleochroic dye has been used in the past in a mixture with operationally nematic liquid crystal material contained in plural volumes in a containment medium or support medium. The structure of the liquid crystal in the absence of a prescribed input is the distorted alignment referred to herein, which is a result of the influence of the containment medium wall. The pleochroic dye structure tends to follow the structure of the liquid crystal, and, therefore, when so distorted or generally curvilinearly aligned effects substantially a maximum amount of color filtering or light absorption. However, as the liquid crystal tends to align with respect to the prescribed input, e.g. so that the axis of the liquid crystal structure tends to align in parallel with the viewing direction or direction of light transmission through the liquid crystal, the structure of the dye also tends similarly to align causing a reduction in the amount of color filtering or light absorption.

The mentioned alignment of liquid crystal structure and pleochroic dye is generally parallel to the direction of the applied electric field when the liquid crystal has positive dielectric anisotropy; in this aligned condition the dye will have minimal absorption, assuming light transmission also generally in the direction of the field. However, if the liquid crystal has negative dielectric anisotropy, e.g. the liquid crystal being cross over material and the frequency of electric field being above the cross over frequency, the liquid crystal structure and the pleochroic dye will align generally perpendicularly or normal to the direction of the applied field; and if the direction of light transmission still is parallel to the direction of the field, the dye will effect substantially maximum absorption of light (of a particular or of multiple colors).

In one preferred embodiment of the invention the containment medium is polyvinyl alcohol. In another, the containment medium is formed of a latex or latex type material. Epoxy material is another example of a containment medium that may be used. Other containment media that cause operation generally along the lines described in further detail herein also may be used.

In the past, displays using liquid crystal material have had to be relatively small in size for a variety of reasons. Using applicant's invention of providing plural volumes of liquid crystal material in a support or containment medium, relatively large- and small-size displays can be made and operated successfully.

A flat screen television system in which an electroluminescent array is repetitively scanned is disclosed in U.S. Pat. No. 3,627,924. Moreover, U.S. Pat. Nos. 3,636,244 and 3,639,685 disclose signal processing circuits for color television picture tubes. In particular, the latter two patents directly relate to color television signal decoding and utilization in a color television system, and the first-mentioned patent discloses a system for scanning electro-luminescent points in an overall electroluminescent array. Such scanning may be employed in accordance with the present invention, and such signal usage and decoding may be employed, too, according to the present invention to achieve the desired multicolored display output from the liquid crystal color display. The circuits of such disclosures may be used in whole or in part in connection with the present invention to obtain various signals required to achieve desired response from the liquid crystal display of the present invention. The disclosures of such patents hereby are incorporated by reference.

Some exemplary definitions are presented below. These are exemplary only and are not necessarily intended to limit the scope of the invention. The context of the description of the invention will present to those having ordinary skill in the art understanding of various broader and more specific definitions of the elements of the invention and of the equivalents thereof.

Reference to light, light output or input, optical output or input, and similar terms generally means that form of electromagnetic energy or electromagnetic radiation which is in the visible spectrum, preferably also including ultraviolet and infrared.

Color generally means the colors of the visible spectrum, preferably also including ultraviolet and infrared. Moreover, depending on the context, generally reference to color below also includes black and white. Complementary colors generally means two colors that are capable of being mixed to produce, when of substantial purity and equal intensity, a black output. In the context of the present invention a black output means that no light is transmitted. Moreover, in the context of the invention preferably the complementary colors are mixed or are combined optically.

In the context of the present invention, a given color or colored light is derived by the filtering of light incident on a color filtering device. Such color filtering device may be of the band pass or band rejection type, as is described in further detail below. A band pass filter transmits a given color, for example. A band rejection filter prevents the transmission of a particular color or colors. Moreover, the mixing or combining of colors according to the invention preferably is achieved by passing light through multiple color filtering devices.

Examples of complementary colors are green and magenta (magenta sometimes is referred to as a negative green); blue and yellow (yellow sometimes is referred to as a negative blue); and red and cyan (cyan sometimes is referred to as a negative red). A negative color, such as negative green, means that when such negative color is combined optically with the positive color, say green, the result is black; specifically the negative green and the green combine to filter all light and eliminate any transmission. For example, a green band rejection filter would transmit only green light and would block all other colors, and a negative green band rejection filter would block green light and would transmit other colors. Thus, an optical serial arrangement of a green band pass filter and a negative green (actually, magenta, which is a negative green), i.e. a green band rejection, filter would block transmission of incident light so as to produce a black output.

A display is a device which provides an output of the optical type capable of being perceived, discerned, and/or understood. Such optical output preferably is capable of being perceived, discerned and/or understood by a living thing, such as a person or animal, e.g. by visually viewing the optical output. However, such optical output may be perceived, discerned, and/or understood by apparatus, such as automated equipment, optical scanners or readers, etc. Exemplary types of optical outputs include an image, an impression, and information.

An image may be a picture, view, or representation of a scene, of an article, of a person or animal, of something abstract, etc. Such images may be still or moving. An impression may be a collection of colors, or of tones and/or shades of colors, and/or omissions of colors or of tones or shades of colors at selected areas of the display, to present a no color, black, white, single color, multicolor, color gradient, etc. output. For example, such an impression may be a viewable field of blue, black, white, etc. Information may be alpha-numeric characters, symbols, color(s), and/or color sequences that can be viewed, read, comprehended, and/or otherwise capable of causing a response. One form of information may be read and understood by a person; the same or other forms of information may be read by apparatus, such as an optical scanner or reader, etc. The invention can produce images, impressions, information, etc.

A light shutter or optical shutter which has a primary function of controlling light throughput also may be considered a display, especially if the light throughput presents an image, impression and/or information.

The primary thrust of the invention is to displays, preferably of the liquid crystal type, capable of providing a multicolor output (image, impression, information, etc.) capable of being viewed by a person. However, it will be appreciated that the features of the invention may be embodied in other types of displays and the like.

BRIEF SUMMARY OF THE INVENTION

Fundamentally, the invention provides a picture element (pel) construction that can take advantage of both subtractive and additive optical, more particularly color, operative principles. This results in the ability to reproduce a wider range of intensity, hue and saturation as well as high resolution black and white, than was heretofor possible in a non-emissive display.

According to one aspect of the invention, a multicolor device employs picture elements that can be viewed to produce an additive color output, and that are formed by plural color subset portions, each including a color part of a first color and a color part of a complementary color By controlling the filtering extent by one or more of the color parts, color and/or intensity control of the output from the picture element can be achieved.

According to another aspect, a liquid crystal color device includes at least one pel for affecting light incident thereon to produce output light, the pel including at least two color subsets, one subset including a first color and the complement thereof, and the other including a second color and the complement thereof, and the subsets being arranged in optical additive relation. Preferably the colors of the respective subsets are in optical series or optically subtractive relation.

According to a further aspect a color television includes such liquid crystal color device.

According to an additional aspect, the color subset portions of the aforementioned device are formed by plural groups of volumes of operationally nematic liquid crystal and respective pleochroic dyes. In a preferred embodiment, each color subset portion includes a color part, respectively, containing red, green, or blue pleochroic dye, and another color part that contains the complement of the respective pleochroic dye in the first-mentioned color part of the given color subset portion.

Still another aspect of the invention relates to a liquid crystal multicolor display, as is described herein, together with a light source for providing incident light for impingement on one side of the display, and driving circuitry, perhaps including a computer, for selectively applying electrical input to the pels to determine the effect each of the pels means has on such incident light thereby to determine characteristics of such output light.

Still a further aspect relates to a method for displaying a multicolor output using a liquid crystal device, including directing incident light to at least one pel for affecting light incident thereon to produce a specified output light, such pel having at least two color subsets, one color subset including a first color and the complement thereof, and the other including a second color and the complement thereof, the two colors of such respective subsets being in optical serial relation, and such color subsets being in optical additive relation, the said directing step including directing incident light to all of such subsets of such pel, and selectively controlling each of the colors of such subsets thereby to determine the color of output light of the liquid crystal device.

Briefly, the invention relates to the producing of a colored output, preferably a multicolored output, by a liquid crystal device that includes pleochroic dye. The liquid crystal device is in the form of a liquid crystal color display that includes at least one, and preferably more than one, picture element or pel. Each pel has plural color subset portions, and each color subset portion includes at least two different groups or volumes of dyed liquid crystal (for example, operationally nematic liquid crystal and pleochroic dye), the volumes of one group being fluidically and/or chemically separated from the volumes of the other group to isolate the respective dyed liquid crystal of each group from that of the other(s), and dyed liquid cyrstal of each group preferably including pleochroic dye of a different respective color. The groups of volumes of dyed liquid crystal material may be in separate respective layers of plural volumes (hereinafter referred to as liquid crystal color layers) or the volumes of two or more groups may be mixed substantially homogeneously while maintaining the respective dyed liquid crystal materials isolated from the other differently dyed liquid crystal material. Such mixed volumes embodiment is referred to below as the distributed volumes or distributed volumes layer embodiment whether the volumes are mixed substantially or less than substantially homogeneously. The volumes of dyed liquid crystal material may be in the form of discrete capsules that are isolated totally from the other capsules or that are fluidically interconnected to one or more capsules of the same group, or both; alternatively, the volumes may be in the form of an emulsion of the dyed liquid crystal in a containment medium, in the form of a stable matrix of the dyed liquid crystal in a containment medium, and so on.

Whether the groups of dyed liquid crystal volumes are in separate liquid crystal color layers of different respective colors or are in a homogeneous distribution of the volumes (distributed volumes embodiment), the layers and/or volumes are arranged in optical serial relation so that incident light transmitted through the display preferably passes through all or at least several of the liquid crystal color layers or differently dyed volumes. Respective color layers or portions thereof or groups of homogeneously distributed volumes may be selectively energized to substantial optical transparency or deenergized to color or to filter light transmitted or passing therethrough. Optical operation of a color subset portion of the liquid crystal color display, then, follows the principles of subtractive color filter operation, and collective operation of the several color subset portions of a pel follows the principles of additive color operation, as are described in greater detail below.

The dyed liquid crystal material in each volume includes operationally nematic liquid crystal material and pleochroic dye, which tends to align according to the structure of the liquid crystal material. Although the structure of operationally nematic liquid crystal material generally tends to assume a straight line configuration, the walls defining the volumes in which the liquid crystal material and pleochroic dye is contained tend to distort the natural liquid crystal structure to a curvilinear alignment in the absence of a prescribed input, in the preferred embodiment an electric field. The curvilinearly aligned or distorted liquid crystal structure may be in a direction generally parallel to the wall(s) defining the volume(s) or may be generally normal to such wall(s). Such curvilinear alignment may be referred to as a nematic curvilinearly aigned phase of the liquid crystal or liquid crystal structure and in such phase the liquid crystal material and dye tend to affect incident light. More specifically, the dye tends to color the light or to filter out a particular color from the light. On the other hand, in the presence of a prescribed input, preferably an electric field, the liquid crystal structure tends to align with respect to the field, and the pleochroic dye structure aligns generally in parallel with the liquid crystal structure; in such parallel aligned or field-on condition or phase the amount of coloring or filtering of light transmitted through the particular liquid crystal color layer is reduced, preferably is minimized, and most preferably the liquid crystal color layer becomes substantially optically transparent.

In a device utilizing two differently dyed liquid crystal groups of volumes, whether of multiple liquid crystal color layers or distributed volumes, or combination version of the liquid crystal color display, operation is, as follows: (a) both groups are off, i.e. in curvilinearly aligned phase such that the dye in both groups affects light serially incident thereon, the transmitted light will be filtered by both groups; (b) when one of the groups is on or in parallel aligned mode and the other is curvilinearly aligned, in the former the amount of filtering by dye therein will decrease, and preferably the volumes in such group become clear, and in the latter filtering still would continue; and (c) when both groups are on or aligned filtering further decreases and preferably all or nearly all incident light is transmitted.

To apply the prescribed input to the respective liquid crystal volumes or groups of volumes, plural electrodes, for example of optically transparent electrically conductive material, are employed. The electrodes are coupled to an electrical supply that may be manually, automatically, or otherwise controlled to determine whether or not an electric field is to be applied to a liquid crystal color layer or to a portion thereof, the voltage of such field and/or the frequency of the field or applied voltage. The electrical supply or drive may be one that includes multiplex circuitry to scan or to address various portions of a liquid crystal color layer or of multiple liquid crystal color layers and/or of distributed volumes layer(s). The electrodes may be dedicated to a particular color layer, may be shared, or may include combinations of both.

For the distributed volumes embodiment, a two-electrode arrangement may be used with the liquid crystal itself or the volumes size providing a function to discriminate between different levels of energization, e.g. voltage or frequency level. For example, different liquid crystal materials may have different voltage threshold requirements; smaller size capsules require a larger voltage field to switch to aligned state relative to that voltage required to switch larger size capsules; and/or the liquid crystal could have a cross-over dielectric anisotropy changing from positive to negative as a function of frequency of applied field or voltage.

According to a further aspect of the invention, a method of coloring light includes directing incident light onto a liquid crystal apparatus having plural picture elements formed by plural groups of volumes of liquid crystal material in a containment medium and at least some of the liquid crystal having pleochroic dye therein, such volumes being arranged in optical serial relationship with respect to the path of such incident light, and selectively applying a prescribed input to one or more respective groups of volumes to alter the optical characteristics thereof to achieve both subtractive and additive optical functions.

According to still another aspect of the invention, a dynamic color image may be created by directing light into a liquid crystal color display including plural groups of volumes of liquid crystal material in a containment medium, a plurality of the volumes having different respective color characteristics, the layers being oriented in optical series relationship, and applying an electric input to one or more portions of the respective volumes to affect the structure and optical characteristics of the liquid crystal material therein to achieve both optical subtractive and additive functions.

According to still an additional aspect of the invention, plural groups of volumes of differently dyed liquid crystal, preferably operationally nematic liquid crystal, are positioned between a pair of electrodes which apply electrical input to the liquid crystal, the groups of liquid crystal volumes being characterized in having different electrical characteristics making possible the separation thereby of a signal from a single pair of electrodes; an additional aspect is that in which such electrical characteristic is voltage level sensitivity; and an additional aspect is that in which such electrical characteristic is electrical frequency sensitivity.

According to even another aspect a cross-linking of materials is employed to establish volume environments for the dyed liquid crystal with secure isolation to minimize the possibility of mixing of one dyed liquid cyrstal material with another dyed liquid crystal material.

According to even an additional aspect the liquid crystal material is capable of discriminating inputs thereto, for example as a function of the frequency or voltage of an applied field; for frequency discrimination a liquid crystal material having different characteristics as a function of frequency, e.g. a cross-over liquid crystal that has positive dielectric anisotropy below a given frequency and negative dielectric anisotropy above such given frequency, may be used; for voltage discrimination different size volumes of the same liquid crystal may be used, whereby smaller capsules require a larger applied voltage to switch than do larger capsules.

According to a further aspect, a liquid crystal device includes a first plurality of volumes of a first liquid crystal material and a second plurality of volumes of a second liquid crystal material, the volumes being formed by a containment medium for tending to distort the natural structure of the liquid crystal material in the absence of a prescribed input, the second liquid crystal material having dielectric anisotropy that is frequency dependent, whereby the optical transmission characteristics of the device are a function of the magnitude and frequency of prescribed input applied to said liquid crystal material. Furthermore, the plurality of volumes may be arranged in optical series for subtractive color operation. Still further a second liquid crystal device like the first but with different pleochroic dyes may be positioned proximate the first for additive color operation.

According to at least another aspect the prescribed input for a liquid crystal color display is provided by circuitry that produces plural signals having high and low frequency portions that are additive with appropriate phase shifting provided to determine the effective magnitude of combined high and/or low frequency signal portions.

According to another aspect, a liquid crystal device uses a phase shifting driving system, with one or more frequencies to achieve particular optical output.

According to another aspect, a liquid crystal color display uses multiple frequency phase shifting driving technique to obtain multicolor optical output.

One object of the invention is to improve accuracy of color presentation, and especially to do so while improving brightness of white, particularly in a liquid crystal color display device.

Another object is to increase the brightness of white light output by a liquid crystal multicolor device.

Still yet another object is to provide parametric control of color in a liquid crystal color device.

Still even another object is to control color by parametric control of the prescribed input of voltage, electric field, and/or frequency applied to liquid crystal material.

A further object is to provide a three color liquid crystal system that has output capability approaching that of a color television or other emissive display.

An additional object is to maintain color accuracy as intensity is changed in a liquid crystal color device.

Still another object is to increase the number of colors obtainable in a liquid crystal color device even at relatively low intensity.

Still a further object is to provide color intensity variation in a liquid crystal color device.

Still an additional object is to obtain intensity control of a liquid crystal device without changing color presentation.

Even another object is to achieve substantially full gray scale output from a liquid crystal color device.

Even a further object is to achieve pastels and intense colors from a liquid crystal multicolor device.

Another aspect is to provide a composite layer of two or more liquid crystal compositions that respond differently to a prescribed input.

Another aspect is to eliminate parallax in a liquid crystal optical serial device.

Another aspect is to maintain adequate resistivity of liquid crystal and a containment medium therefor to obtain adequate electric field across the liquid crystal in response to an applied voltage to affect the alignment of the liquid crystal structure.

These and other objects, aspects, features, embodiments and advantages will become more apparent from the following detailed description of the invention.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENT

Figure 1:
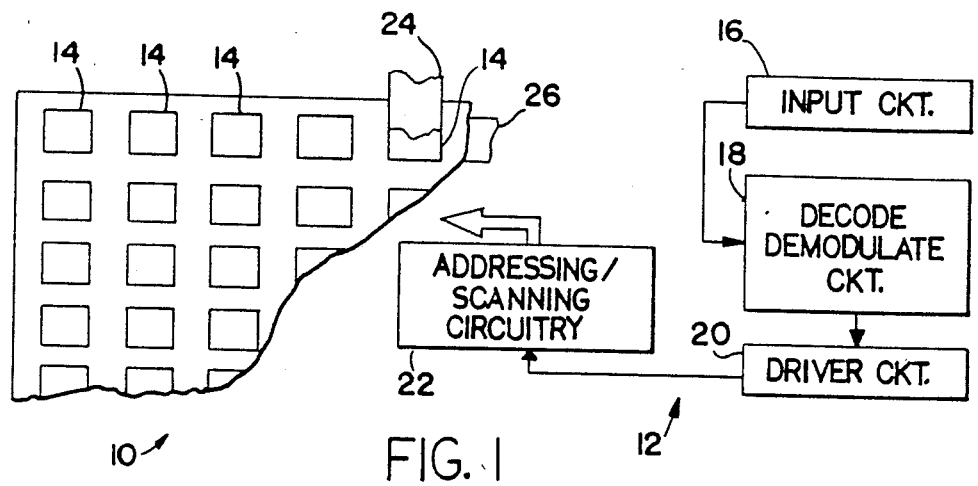
FIG. 1 is a schematic illustration of a liquid crystal multicolor display in accordance with the present invention.

Referring, now, in detail, to the drawings, wherein like reference numerals represent like parts in the several figures, and initially to FIG. 1, a liquid crystal color display in accordance with the present invention is generally represented at 10. The liquid crystal display 10 is intended to produce a multicolor output in response to a prescribed input provided by electrical circuitry 12. Together, the liquid crystal display 10 and the circuitry 12, then, represent a multicolor display device capable of providing still and moving images, for example like those produced by a color television. It will be appreciated that the several embodiments and features of the invention disclosed herein may be used with other embodiments and features disclosed herein and with equivalent devices, as will be apparent to those having skill in the art.

The invention is described in detail with respect to a display device for producing multicolor outputs, such as in a color television type device or the like. However, it will be appreciated that the term display or device as used herein may have broader meaning contemplating various devices that produce output information, images, etc., that can be viewed or otherwise used as an input of optical type to another device.

As it is used herein, the term light preferably means electromagnetic that is in the visible spectrum. However, it will be appreciated that the principles of the invention may be used with electromagnetic radiation outside the visible spectrum. Furthermore, although the invention is described for use with electric field as the prescribed input, it will be appreciated that the principles of the invention may be employed in devices using other than electric field as the prescribed input. Also, the drive circuit 12 is exemplary, and other types of circuits may be used to achieve the desired prescribed input.

The fundamental building block of the display 10 of Fig. 1 is a picture element 14, sometimes referred to as a picture element or pel. The display 10 preferably includes at least one and preferably a plurality of pixel elements 14 that are arranged in side by side relation to produce a color output that is capable of being viewed, for example, in additive fashion. In particular, the pels 14 are adequately small so that when viewed by a person there is an additive combination (for example achieved by the eye) in a manner similar to the result achieved when a color television (having many color dots) is viewed.

However, according to the present invention, each pel 14 of the display 10 is capable of producing a number of colors and of controlling the intensity of the color light produced thereby. Therefore, each pel 14 in a sense may be viewed alone or in combination with other pels to form part of an image produced by the display 10. The details of the pixel elements 14 are described in further detail below.

If desired, as is shown in FIG. 1, the circuitry 12 includes an input circuit 16, which receives input information for creating an image by the display 10. Such input circuit may be, for example, a television receiver that receives a video signal, may be a computer for generating an image signal, etc. The input circuit 16 is coupled to a decode and demodulate circuit 18, the purpose of which is to decode and/or to demodulate the input signal to generate signal portions intended to control individual pixel elements 14 of the display 10. A driver circuit 20 responds to such decoded and demodulated signal information from the decode/demodulate circuit 18 actually to generate the signals, such as voltages that will produce electric field, that will be the prescribed input directly to affect respective pels or subset portions thereof, as are described in further detail below. Additionally, the circuit 12 includes scanning or addressing circuitry 22, the purpose of which is to apply the prescribed input generated by the driver circuit 20 to respective pixel elements or subset portions thereof.

The pels may include non-linear devices, such as thin film transistors, to help with the turn on of liquid crystal color parts, subsets and pels hereof and to increase the analog range of response of the individual color parts beyond normal range of control of the liquid crystal. Such use of non-linear devices to turn on or otherwise to affect properties of liquid crystal devices and/or for response range increase is known.

Figure 9:
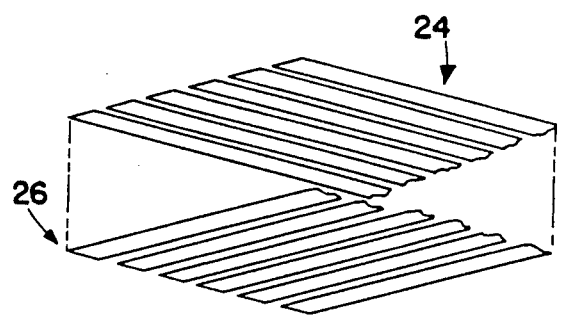
FIG. 9 is an isometric view of a representation of crossed electrodes of FIG. 1, 3 and 8.

A plurality of electrodes, preferably plural arrays of crossed electrodes 24, 26, as is illustrated in FIG. 9, two of which are represented at 24′, 26′, are provided to couple the prescribed input to the respective pels 14. As is seen in FIG. 1, the electrodes 24′, 26′ cross each other at a pel 14′. When a particular electrical signal is applied by such crossed electrodes, such signal may cause the pel 14′ to alter the effect thereof on light incident thereon. By rapidly scanning or addressing respective pels 14, the circuit 10 can cause the display to produce a still or a moving image, as may be desired, and generally as is well known in the television art. Moreover, as will become more apparent from the following description, one or both of the electrodes 24, 26 preferably is formed by multiple electrode portions so that each of the color subset portions of each pel 14 can be respectively addressed.

Figure 2:
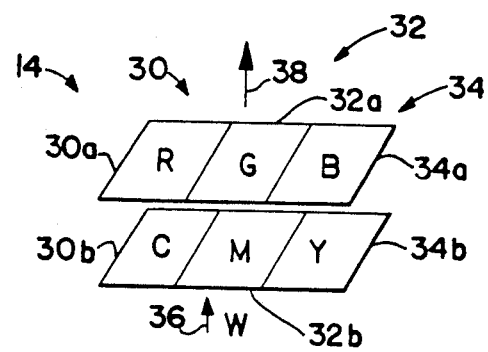
FIG. 2 is a schematic isometric view of a picture element, including three color subsets thereof, of the display of FIG. 1.

Turning to FIG. 2, a picture element 14 is shown in detail. The pel 14 includes plural, preferably three, color subset portions 30, 32, 34; and each subset portion includes two different color parts, respectively designated 30a, 30b, 32a, 32b, 34a, 34b. The two color parts of each respective color subset portion are arranged in subtractive color relation; the illustrated embodiment of FIG. 2 showing the respective color parts oriented in optical serial alignment for convenience of illustration and the following description. Although the preferred embodiment has two color parts for each color subset portion, it will be appreciated that each color subset portion may be formed of more than two color parts. Moreover, as is described further below, each color part of each color subset portion can be controlled to determine the degree of color filtering of incident light, such as that represented at 36, to produce output light, such as that represented at 38. Such control is achievable, according to the preferred embodiment, because the pel, including the subset portions and parts thereof, is formed of liquid crystal material that is responsive to a prescribed input to alter the amount of coloring or color filtering of light incident thereon and transmitted therethrough.

According to the preferred embodiment and best mode of the invention, the two color parts of each color subset portion are, respectively, of a first color and the complement of that first color. Moreover, such first colors of each of the color subset portions preferably constitute a triad of colors, such as the red, green, and blue triad typically used in multicolor displays of color televisions, etc. Therefore, as will become more apparent from the following description, using such a red, green and blue triad (sometimes referred to as the RGB triad) in each pel 14, a multiplicity of colors can be created using additive color techniques that are well known in the color television art. Specifically, the color parts of each pel 14 are so small that the eye of an observer ordinarily preferably is able to merge the colors to create an impression of a composite color.

The complementary colors of the RGB triad are, for example, cyan, magenta and yellow, which are, respectively, the colors of the color parts 30b, 32b, 34b in FIG. 2. Thus, it will be appreciated that the subset portion 30 is formed of a red color layer or part 30a and a cyan color layer or part 30b. The subset portion 32 is formed of a green color layer or part 32a and a magenta color layer or part 32b; and the subset portion 34 is formed of a blue color layer or part 34a and a yellow color layer or part 34b. The color parts 30a, 32a, 34a of the RGB triad may be considered band pass filters; on the other hand, the color parts 30b, 32b, 34b are, in a sense, band rejection filters.

Therefore, when both color parts of a given color subset portion, such as color subset portion 30 with color parts 30a, 30b, are filtering light essentially to the maximum extent, substantially no light is transmitted through the given color subset portion, and a black output results. On the other hand, by controlling the extent or degree of filtering of light achieved by one or more color parts, e.g. 30a, 30b, etc., output light of various colors and intensities can be achieved.

Briefly, in operation of the pel 14 of FIG. 2 is, for example, with all color parts filtering to the maximum extent, the output light is black, i.e. substantially none of the incident light is transmitted through the pel 14. With all color parts of the pel 14 transmitting light, a maximum light output will occur and the color thereof will be white, i.e. the color of the incident light. Importantly, since the invention does not require the use of polarizers, the intensity of the output light when all color parts of the pel 14 are fully transmitting will be about eighty percent of the incident light, quite a lot more than that possible for prior twisted nematic liquid crystal devices that use polarizers which appreciably reduce transmitted light.

With the color part 30b (cyan) fully transmitting and all the other color parts of the pel 14 substantially fully filtering, the output color of the pel will be red due to filtering by the color part 30a. The color subset portions 32, 34 will be producing black, i.e. no transmission. On the other hand, with both color parts 30b, 32b transmitting and the other color parts substantially fully filtering light, the output light will be an additive mixture of the red from color part 30a and the green from color part 32a. Moreover, in the latter case alteration of the extent of filtering by one or both of the color parts 30a, 32a can alter the additive mixture of the pel 14 as viewed by an observer. It will be appreciated that the aforesaid operation is extendible to each of the color subset portions 30, 32, 34 and to the various combinations thereof to achieve both color and intensity control functions, i.e.

substantially full parametric control of the pel 14. Additional details of operation of the pel 14 and the overall display 10 will be described in further detail below.

Figure 3:
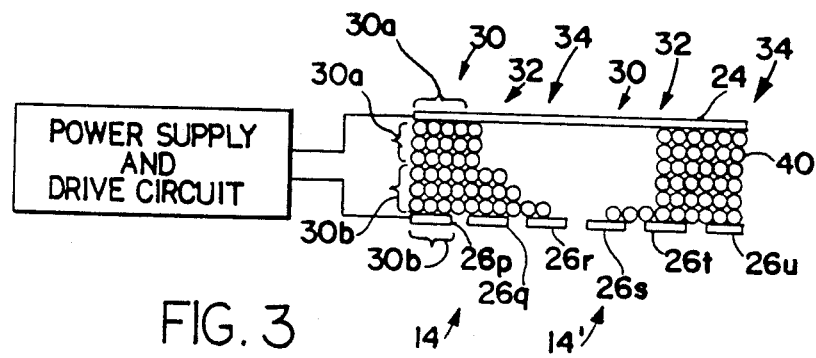
FIG. 3 is a schematic side elevation view of a pair of picture elements, including the color subsets thereof, in accordance with the display of FIG. 1.
Figure 4:
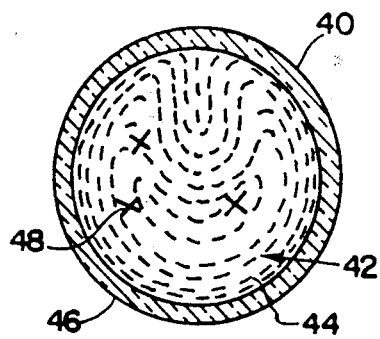
FIG. 4 is a schematic view of a liquid crystal volume including pleochroic dye, as used in the color subsets and picture elements, the liquid crystal material being in distorted alignment generally in parallel with the volume wall.
Figure 5:
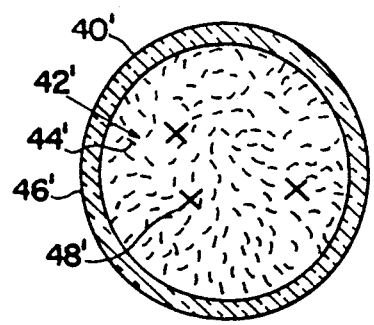
FIG. 5 is a schematic view of a liquid crystal volume including pleochroic dye, as used in the color subsets and picture elements, the liquid crystal material being in distorted alignment generally normal with the volume wall.
Figure 6:
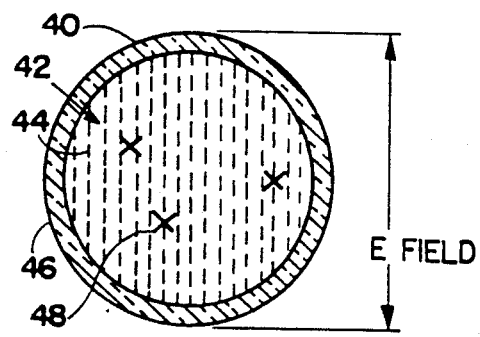
FIG. 6 is a schematic view of a liquid crystal volume including pleochroic dye, as used in the color subsets and picture elements, the liquid crystal material being in generally parallel alignment in response to a prescribed input.

Turning to FIG. 3, an example of two pels 14, 14' in accordance with the invention is shown coupled to a power supply and drive circuit 12. The pels 14, 14' are formed plural volumes of liquid crystal material in a containment medium together with respective pleochroic dyes. Such volumes of liquid crystal, several of which are illustrated in FIGS. 4, 5 and 6, are described in detail, for example, in U.S. Pat. No. 4,435,047 and in the other cross-referenced patents and patent applications referred to above. The pel 14 includes the three color subset portions 30, 32, 34 with the respective color parts 30a, 30b, 32a, 32b, 34a, 34b. Each color part is formed of plural volumes of liquid crystal material with a particular pleochroic dye in a containment medium. Each of the color parts of each pel 14, 14', as is shown in FIG. 3, e.g. within the boundaries of the horizontal and vertical brackets designated 30a, 30b, includes approximately nine volumes, although the actual number of volumes in a given color part may be larger, and preferably is larger, than nine, and whether or not the number is equal for all or some of the color parts may be determined by the paritcular application.

Crossed electrodes are used to apply electric field to the liquid crystal volumes to determine whether or not the liquid crystal is to be aligned with the electric field, and, if so, the degree of such alignment. For simplicity of illustration, electrode 24 (one strip of several constituting the electrode 24) is shown extending across one side, i.e. the top as is seen in FIG. 3, of both pels 14, 14'; and electrodes 26 extend across the other side of the respective pels 14, 14' preferably in normal crossed relation to the electrodes 24. The electrodes may be coatings of indium tin oxide on Mylar or other sheet like support media for the volumes of liquid crystal material described herein.

For identification purposes, the electrodes 26 are identified by reference numerals 26p, . . . 26u. The electrode 26p extends below the color parts 30a, 30b; the electrode 26q extends below the color parts 32a, 32b; the electrode 26r extends below the color parts 34a, 34b; etc. for pel 14'. Therefore, as a function of the voltage, frequency, electric field or other characteristic applied by electrodes 24, 26p, the color filtering characteristics of the color parts 30a, 30b may be altered or controlled. The same is true for the color parts 32a, 32b in response to the prescribed input, if any, applied thereto by the electrodes 24, 26q, and so on for the other color parts of the other color subset portions of the respective pels 14, 14' and other pels of the display 10.

In FIGS. 4, 5 and 6 are illustrated enlarged views of exemplary volumes or capsules 40 (volume 40, of FIG. 5 is similar to the volume 40 of FIG. 4 except that in the volume 40 the liquid crystal structure is distorted to generally parallel alignment with the wall defining the volume at such wall, and in the volume 40' the liquid crystal structure is distorted to generally normal alignment with such wall) of liquid crystal material used in the pels 14, 14' of the display 10 according to the invention. Although the volumes 40, 40' are shown as spherical capsules or cells, the shape of such volumes may be other than spherical and the volumes may be other than discrete volumes, e.g. interconnected. In FIGS. 4 and 5 the volumes are shown in field off condition or in any event in a condition such that the liquid crystal structure is distorted and causes absorption of light, particularly by pleochroic dye contained in the liquid crystal; and in FIG. 6 the liquid crystal is shown in field on condition with the liquid crystal structure aligned with respect to the applied electric field to minimize absorption of light, particularly by the pleochroic dye contained in the liquid crystal.

In FIGS. 4, 5 and 6 the liquid crystal material is designated 42, and the structure thereof is designated 44. The containment medium is designated 46, and the pleochroic dye in the liquid crystal is designated 48. Such dye tends to align, e.g. as in a guest host relation, with respect to the structure of the liquid crystal material. Therefore, the dye in the volumes 40, 40' of distorted liquid crystal shown in FIGS. 4 and 5 tends to absorb light; and the dye in the volume 40 of aligned liquid crystal 42 structure 44 will tend to have minimal absorption effect on light that is transmitted generally in the direction of the applied electric field and, thus, in the direction of such alignment.

Since the liquid crystal 42 is operationally nematic, the structural organization in an individual capsule is predetermined by the organization of the structure at the wall of the capsule and is fixed unless acted on by outside forces, such as an electric field, as is represented in FIG. 6. On removal of the field, the directional orientation would revert back to the original distorted one depicted in FIGS. 4 or 5.

Moreover, due to the distortion of liquid crystal structure and the alignment of pleochroic dye with respect to the liquid crystal structure, the absorption of light by such dye, for example, will be substantially independent of polarization. Therefore, the invention is operative without the need for polarizers. Specifically, due to the interaction between the wall of the capsule and the liquid crystal, an orientation in the liquid crystal near that wall is generally uniform and piecewise continuous, so that the spatial average orientation of the liquid crystal material over the capsule volume is strongly curved and there is no substantial parallel directional orientation of the liquid crystal structure in the absence of a prescribed input. It is this strongly curved orientation that results in polarization insensitivity and, in particular, color filtering by the pleochroic dye in the field off condition.

Nematic type liquid crystal material usually assumes a parallel linear structural configuration and usually is optical polarizaton direction sensitive; and since pleochroic dye ordinarily aligns with respect to the liquid crystal structure in guest host relation, such dye also usually would be optically polarization direction sensitive. However, due to the aforementioned distortion of structure in the absence of prescribed input, the liquid crystal and dye are generally insensitive to polarization direction and polarizers are not required.

However, in the field-on condition or in the condition of the liquid crystal structure generally in parallel with an applied electric field such that the structural alignment is generally in parallel with viewing direction or light transmission direction, i.e. along the axis of the liquid crystal material, as is shown in FIG. 6, for example, the encapsulated liquid and dye therein will tend to transmit substantially all incident light passing in such direction with minimal, if any, filtering or color absorption.

Desirably, the ordinary index of refraction of the liquid crystal 42 and the index of refraction of the containment medium 46 are the same and the extraordinary index of refraction of the liquid crystal differs from the index of refraction of the containment medium. This relation will result in maximum contrast. Preferably the index of ordinary index of refraction and that of the containment medium 46 differ by no more than about 0.03, more preferably 0.01, and most preferably 0.001. The tolerated difference for a quality display will depend, for example, on the capsule size.

Preferably, to obtain deep colors, e.g. of good saturation and hue, it is desirable that the liquid crystal material itself have relatively low birefringence and that both the ordinary and extraordinary indices of refraction of the liquid crystal match or otherwise be substantially the same as the index of refraction of the containment medium. Therefore, the volumes of liquid crystal and pleochroic dye will function substantially exclusively as a controllable color filter and/or light transmitting device and not as a light scattering device.

The electrical characteristics of the liquid crystal material 42 and of the containment medium 46 should be such that in response to an applied voltage to the volume of liquid crystal by the electrodes 24, 26, for example, adequate electric field is provided across the liquid crystal and short circuits are avoided. Capsule size may be on the order of from about 0.3 micron to about 100 microns. Preferred size ranges are 0.3 to 30 microns; 3 to 15 microns, and especially about one half or one micron to about 15 microns.

To achieve adequate performance of the invention, it is desirable that the resistivity of the layers of volumes of liquid crystal and containment medium be adequately high so that in response to an applied voltage across the layer, an electric field that will tend to affect, e.g. to cause alignment of, the liquid crystal will be produced. Therefore, it is desirable to purify the containment medium to avoid impurities that could reduce such resistivity. For example, if the containment medium were polyvinyl alcohol, the same could be purified by Soxlet extraction with methanol for thirty-six hours to remove ionic impurities—particularly those that would be soluble in the liquid crystal.

Two preferred liquid crystal materials in accordance with the invention includes 1800 and 2359 liquid crystals by E. Merck of West Germany. Other exemplary liquid crystal materials include cholesteryl ester combinations, phenyl cyclohexanes, dicyclohexanes, biphenyl and/or biphenyl combinations, and the like, that are operationally nematic. Other examples of liquid crystal material are presented in the following chart. The examples represent recipes; the so-called 10% material has about 10% of 4-cyano material substituted materials; the 20% material has about 20% 4-cyano substituted materials, and the two 40% materials are respective recipes for 40% 4-cyano substituted materials.

| CHART 1 | | |
|---|---|---|
| 1. | 10% Material | |
| | Pentylphenylmethoxy Benzoate | 54 grams |
| | Pentylphenylpentyloxy Benzoate | 36 grams |
| | Cyanophenylpentyl Benzoate | 2.6 grams |
| | Cyanophenylheptyl Benzoate | 3.9 grams |
| | Cyanophenylpentyloxy Benzoate | 1.2 grams |
| | Cyanophenylheptyloxy Benzoate | 1.1 grams |
| | Cyanophenyloctyloxy Benzoate | 9.94 grams |
| | Cyanophenylmethoxy Benzoate | 0.35 grams |
| 2. | 20% Material | |
| | Pentylphenylmethoxy Benzoate | 48 grams |
| | Pentylphenylpentyloxy Benzoate | 32 grams |
| | Cyanophenylpentyl Benzoate | 5.17 grams |
| | Cyanophenylheptyl Benzoate | 7.75 grams |

-continued

| CHART 1 | | |
|---|---|---|
| | Cyanophenylpentyloxy Benzoate | 2.35 grams |
| | Cyanophenylheptyloxy Benzoate | 2.12 grams |
| | Cyanophenyloctyloxy Benzoate | 1.88 grams |
| | Cyanophenylmethoxy Benzoate | 0.705 grams |
| 3. | 40% Material | |
| | Pentylphenylmethoxy Benzoate | 36 grams |
| | Pentylphenylpentyloxy Benzoate | 24 grams |
| | Cyanophenylpentyl Benzoate | 10.35 grams |
| | Cyanophenylheptyl Benzoate | 15.52 grams |
| | Cyanophenylpentyloxy Benzoate | 4.7 grams |
| | Cyanophenylheoptyloxy Benzoate | 4.23 grams |
| | Cyanophenyloctyloxy Benzoate | 3.76 grams |
| | Cyanophenylmethoxy Benzoate | 1.41 grams |
| 4. | 40% MOD | |
| | Pentylphenylmethoxy Benzoate | 36 grams |
| | Pentylphenylpentyloxy Benzoate | 24 grams |
| | Cyanophenylpentyl Benzoate | 16 grams |
| | Cyanophenylheptyl Benzoate | 24 grams |

Examples of techniques for making the encapsulated liquid crystal material are described in the above patents and applications. See, for example, the above '047 patent. Summarizing, one exemplary method includes mixing the liquid crystal material and containment medium to form an emulsion; applying the emulsion to a support medium, such as a Mylar film or sheet material, preferably one that includes an electrode already deposited thereon (e.g. sold as Intrex film); allowing the emulsion to cure; and finally applying a further electrode.

Exemplary containment medium 46 are polyvinyl alcohol, latex, epoxy, and others that preferably do not affect and are not affected by the liquid crystal material. Several polyvinyl alcohol polymers include those sold under the trademarks Gelvatol, Elvanol and Poval. An acid type containment medium is that sold under the trademark Carbopol, which is a carboxy polymethylene polymer sold by B.F. Goodrich Chemical Company. An exemplary ratio of liquid crystal to containment medium may be from about 1 to 1 to about 1 to 3. Other ratios also may be used, depending on desired operation.

Preferably the encapsulated liquid crystal, i.e. the volumes of liquid crystal material in a containment medium, is supported on a further support medium, such as Mylar film, Tedlar film, glass or other support medium.

The pleochroic dye 48 in the respective volumes 40 of liquid crystal 42 preferably is of the same concentration in each volume for convenience. Moreover, the concentration of each color of pleochroic dye in the respective color parts 30a, 30b, etc. preferably is the same for convenience of operational control and/or understanding of the invention. Therefore, balanced operation can be achieved for each color subset portion 30, 32, 34 for each pel 14 in response to the same electrical inputs. However, if desired, the uniformity of such concentrations may be altered to achieve a particular operational characteristic of the display 10. Further contributing to uniformity of operation and electrical response, preferably the dimensions of the individual volumes in each color part of the display 10 and the dimensions of the respective color parts themselves are the same on a volume by volume and color part by color part basis.

Referring back to FIG. 3, it will be seen that each color part 30a, 30b, etc. is formed by a plurality of volumes of liquid crystal in a containment medium, and each volume preferably includes pleochroic dye. The particular pleochroic dye will be the same for all the volumes making up a given color part. Also, by mixing pleochroic dyes, different colors can be obtained and generally uniformity of response and operation can be facilitated. Thus, for example, the pleochroic dye used to form green pleochroic dye may be a mixture of a yellow pleochroic dye and a cyan pleochroic dye. Using such dye mixing principle, it is possible to obtain the three red, green and blue color dyes, respectively, for example, by using mixtures of magenta, yellow and cyan dyes; and the three complementary color dyes cyan, magenta and yellow themselves can be the pure forms thereof.

Examples of yellow pleochroic dye is Sudan-I; of cyan is Indophenol Blue; and of magenta is D-37 (British Drug House).

Operation of the display 10 (FIG. 1) including plural pels 14, 14', etc. (FIGS. 2 and 3) is summarized, as follows. In the absence of a prescribed input or of an adequate prescribed input to cause alignment of the liquid crystal structure in any given color part 30a, 30b, etc., none or substantially none of the incident light 36 will be transmitted through the display or the particular area thereof of concern; and the resulting output 38 at such area will be black. By applying prescribed input to a given pel 14, for example, using electrodes 24, 26 (or the respective portions thereof aligned with repsective color subset portions 30, 32, 34), the liquid crystal in one or more color parts will align to an extent so as to reduce filtering, coloring or absorption of the particular color associated with the pleochroic dye of such color part(s). The color produced by each color subset portion of a given pel 14 will be determined by the pleochroic dyes therein and by the degree of parallel (non-absorbing) alignment of the liquid crystal and dye in the color parts of such color subset portion according to the principles of subtractive color filtering. Moreover, the apparent color of the pel that includes several color subset portions will be a function of color addition of the colors of the respective color subset portions of the pel. Further, the color of a given area of the display 10, e.g. including one pel or a plurality of pels 14, may be an additive color function somewhat like the additive operation of the color dots of a color television or may be individually discretely viewable to form discernible portions of an image, for example, depending on the actual size of the individual pels 14.

To make the liquid crystal color subset portions 30, 32, 34, the color parts 30b, 32b, 32c may be formed by applying separate groups of volumes of liquid crystal with respective pleochroic dyes therein to a support medium, such as Mylar sheet, on which the electrodes 26 are already deposited. Such application of volumes of liquid crystal with pleochroic dye may be effected by applying respective emulsions to respective areas of the support medium. After such emulsions have cured to stable form, the color parts 30a, 32a, 34a may be separately applied to the top of the already deposited layers of volumes of the color parts 30b, 32b, 32c. Since the respective color parts 30a, 30b, etc. are formed in separate steps and because the top layer or color part is not applied until the one beneath has cured, separation of the liquid crystal materials of such volumes and of the pleochroic dyes of such volumes is maintained.

On the other hand, using the strong capsules described generally below and in detail in applicant's concurrently filed patent application mentioned above, the several liquid crystal color parts of a liquid crystal color subset portion may be applied simultaneously instead of in separate layers. Indeed, the volumes of liquid crystal material containing one pleochroic dye may be deposited essentially at the same as the volumes of liquid crystal material containing a second pleochroic dye, say the complement of the first mentioned dye.

Capsule-like environments or volumes for the dyed liquid crystal material can be formed in such a way as to maintain substantial isolation of the liquid crystal in one capsule/volume from the liquid crytal in another volume or otherwise in contact with the exterior of the first-mentioned capsule. Such strong capsules defining volumes of contained liquid crystal may be used in the several embodiments of the invention.

Such capsules can be formed by a condensation reaction, more preferably by a polycondensation reaction, and most preferably by a reaction that yields a crosslinking or crosslinking type result. In a preferred embodiment such capsules are formed from a solution of the liquid crystal material and a cross-linkable polymeric material, on the one hand, and another cross-linkable polymeric material on the other hand. The two polymeric materials are reactable to effect a crosslinking of the polymer, especially at the surface, to form a capsule which is water-insoluble and water-impermeable. When the liquid crystal material and first cross-linkable polymer material are not intersoluble, a solvent such as chloroform can be utilized. Such resulting cross-linked polymer containment medium has substantial isolating characteristics so as to maintain the dyed liquid crystal therein substantially isolated from that in other capsules or that outside the given capsule.

The isolation provided by such strong capsules improves longevity of a liquid crystal display employing such materials; such material also avoids deterioration due to external environments, water, humidity, dirt, chemicals, etc. Due to such isolation, the capsules sometimes are referred to herein as isolating capsules.

In the preferred embodiment of the invention, such crosslinking is achieved by mixing a maleic anhydride derived copolymer, for example one known as poly(-methyl vinyl ether/maleic anhydride) made and/or sold by GAF Corporation under the identification Gantrez 169. The dyed liquid crystal material may be one of the materials identified in Chart 1 above. A solvent, such as chloroform, may be added to facilitate the dissolving of the maleic anhydride polymer in the liquid crystal material itself. The solution just mentioned is mixed with polyvinyl alcohol, and a cross-linking reaction occurs to form a water insoluble polymer.

Figure 7:
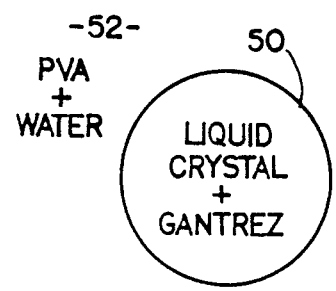
FIG. 7 is a schematic illustration of a strong capsule volume configuration useful in accordance with the present invention.

In FIG. 7 is shown the formation of a capsule using the liquid crytsal and Gantrez 169 in the center 50; and PVA and water 52 about the outside. The cross-linking reaction occurs at the boundary of the liquid crystal and Gantrez mixture 50 to form a capsule. The result is the formation of an insoluble skin, film or wall confining the liquid crsytal material and dye within the capsule. The film is insoluble in both the liquid crystal and in the water.

It is due to the observation of the film and to the observing of water insolubility of the capsules that actual cross-linking is believed to occur when the two mentioned polymer materials react. For these reasons the capsule walls are referred to as being formed of cross-linked material. However, it is important to note that whether or not classical cross-linking occurs, the result of the invention yields a strong, substantially water insoluble capsule.

Thus, fundamentally the strong capsules are formed by a pair of reactants, one of which is water soluble and the other of which is soluble in the liquid crystal material; and those reactants together undergo a polycondensation reaction.

EXAMPLE 1

A poly(methyl vinyl ether/maleic anhydride), namely 2% Gantrez 169, was dissolved in a 40% cyano liquid crystal material mentioned above. 20% chloroform was added in the mixture as a solvent. To such solution a 22% solution of 20/30 PVA (the remainder being water) was mixed. The resulting mixture was allowed to sit for about one hour, and the result was a suspension of liquid crystal in capsules in which the wall was formed by the product of the cross-linking reaction between the maleic anhydride moiety and the PVA.

The liquid crystal, Gantrez and chloroform should be intersoluble. Various other materials may be used to form the strong capsules as long as the cross-linking is achieved to provide strength, durability and insolubility of the capsules. In some instances the pleochroic dye may be incompatible with one or more of the materials used, for example being soluble therein; and in such case either a different dye must be used or the strong capsules cannot be used.

An example of a compatible dye is D-54 and Indophenol Blue. The strong capsules can be used to produce two or more groups of capsules, respectively containing different liquid crystal materials and pleochroic dyes. The groups of capsules can be mixed together without destroying the integrity of the individual capsules, and, therefore, the plural groups of capsules may be laid down on the substrate or support medium mentioned above to form simultaneously the two color parts of a given liquid crystal color subset portion 30, 32, 34, for example, of a given pel 14 and/or of multiple pels. Also, instead of having two separate groups of strong capsules, one group of volumes of liquid crystal and pleochroic dye may be in such strong capsules, and such strong capsules may be distributed in a further emulsion formed of another liquid crystal material and pleochroic dye.

Other exemplary cross-linking producing materials or condensation agents useful according to the invention include an aldehyde, a dialdehyde, a polycarboxylic acid or a polycarboxylic anhydride; and more specifically may be at least one of the group gluteral aldehyde, dioxal glycoxal acetaldehyde, formaldehyde, phthalic anhydride, maleic anhydride, poly(methyl vinyl ether/maleic anhydride), and polyvinyl methoxymaleic anhydride. Further condensation agents would be diisocyanates, such as toluene diisocyanate, hexometholene diisocyanate, and others that will undergo polycondensation reaction with alcohols, for example.

The water soluble polymer part of the ingredients to form the strong capsules may be, for example, the mentioned polyvinyl alcohol, or any polyhedric alcohol. Examples are ethylene glycol and water, propylene glycol and water or glycerine and water.

Other techniques and materials may be used to form the desired strong capsules described herein. Such materials, though, should produce the described cross-linking for strength and integrity of the capsule.

Figure 8:
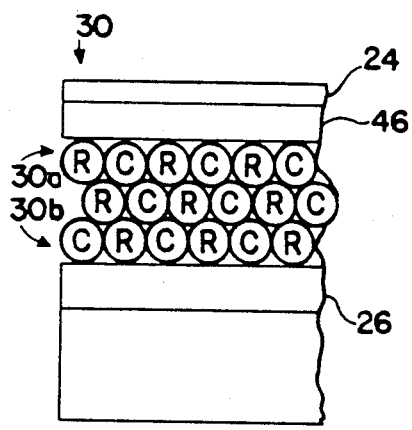
FIG. 8 is an enlarged fragmentary view of a color subset of a picture element of the invention.

In FIG. 8 is illustrated an example of a color subset portion 30, including color parts 30a, 30b, of a pel 14 in which the two groups of volumes of liquid crystal and pleochroic dye are distributed generally uniformly relative to each other instead of in respective separate layers. The capsules in the subset portion 30 of FIG. 8 are the strong capsules, and those identified by 30a' include red pleochroic dye while those identified by 30b' include cyan pleochroic dye, the complement to red. Since the red and cyan capsules are distributed mixed as shown, only a single pair of electrodes 24, 26 or electrode portions is required to apply electrical input to one or both color parts 30a, 30b of the subset 30.

Based on the size, e.g. diameter, of the respective capsules, the voltage and/or frequency characteristics of the liquid crystal in the respective capsules, and/or other parameters, the prescribed input may selectively affect the liquid crystal in the different respective volumes. For example, the liquid crystal material in one group of volumes 30a', for example, may switch or align relative to a lower voltage electric field than that required for alignment of the liquid crystal in the other group of volumes 30b'. The liquid crystal materials identified in Chart 1 above have different threshold voltage levels required to effect alignment thereof to overcome distortion caused by the capsule walls of the volumes containing the same. Also, the liquid crystal material in one of the groups of volumes may be cross over liquid crystal so that the dielectric anisotropy thereof switches from positive to negative as the frequency of electric field exceeds a prescribed threshold level; and this characteristic may be used to discriminate the prescribed input. Such discrimination of prescribed input is described in further detail in the above mentioned concurrently filed patent application.

Using the distributed volumes of liquid crystal and pleochroic dye, as is illustrated in FIG. 8, when the prescribed input off such that the liquid crystal is distorted and the dye is filtering in both groups of volumes, no light will be transmitted. When the liquid crystal of only one of the groups is aligned, the pleochroic dye therein does not filter light, but the other may be filtering if still in distorted alignment to cause a particular color output. Further, if both the liquid crystal materials in both groups are aligned with respect to applied field to minimize filtering by the dye therein, the output will be the same as the color of the incident light, e.g. white.

It will be appreciated that each of the color subset portions of each pel 14 may be made using the distributed volumes of liquid crystal, including respective pleochroic dyes, as is illustrated in FIG. 8 for one such subset portion.

The strips of electrodes 24, 26 oriented in crossed relation are illustrated in FIG. 9. Such electrodes may be used in each of the embodiments disclosed herein to apply prescried input to the respective pels and/or to the color subset portions of the respective pels, as is described further herein. Such electrodes would be coupled to the circuitry 12 to receive a voltage thereby to apply electric field of prescribed magnitude and/or frequency, as is described herein, to achieve the desired operation of the liquid crystal device 10.

Also, importantly, the volumes of liquid crystal and pleochroic dye may be applied to the support medium using silk screening techniques, and this allows a display 10 according to the invention to be manufactured relatively inexpensively and rapidly.

Various methods and examples of liquid crystal, containment media, volumes formed thereof, and layers and displays formed using the same are disclosed in copendinq, concurrently filed patent application mentioned above and in the above-mentioned patents. The disclosures thereof are incorporated by reference as though presented in the text of this patent application.

Regarding the display 10, if the pels 14 are rather small, e.g. like color dots of a color television, the colors produced at prespective proximate pels are added or, in a sense, integrated, by the eye of an observer. The colors of individual pels are produced by subtractive color technique in respective color subset portions thereof and by additive color technique vis-a-vis the several color subset portions of a given pel 14. The pels themselves, too, are able to provide optical additive operation, e.g. as with the color dots of a color television.

OPERATION ACCORDING TO THE CIE CHROMATICITY DIAGRAM

Several definitions are provided here from "Color Science: Concepts And Methods, Quantitative Data And Formulae" by Wyszecki & Stiles (Published by John Wiley & Sons, Inc., 1982). Such book is hereby incorporated by reference.

"Hue" is the attribute of a color perception denoted by blue, green, yellow, red, purple, and so on.

"Brightness" is the attribute of a visual sensation according to which a given visual stimulus appears to be more or less intense; or, according to which the area in which the visual stimulus is presented appears to emit more or less light.

"Chromaticness" is the attribute of a visual sensation according to which the percieved color of an area appears to be more or less chromatic. Chromaticness has also been referred to as colorfulness.

A chromatic color is a perceived color possessing hue; an achromatic color is perceived color devoid of hue.

"Saturation" is the attribute of a visual sensation which permits a judgment to be made of the degree to which a chromatic stimulus differs from an achromatic stimulus regardless of their brightness.

In summary form, then, saturation sometimes may be considered a function of white light in a color; hue may be considered the actual color.

Figure 10:
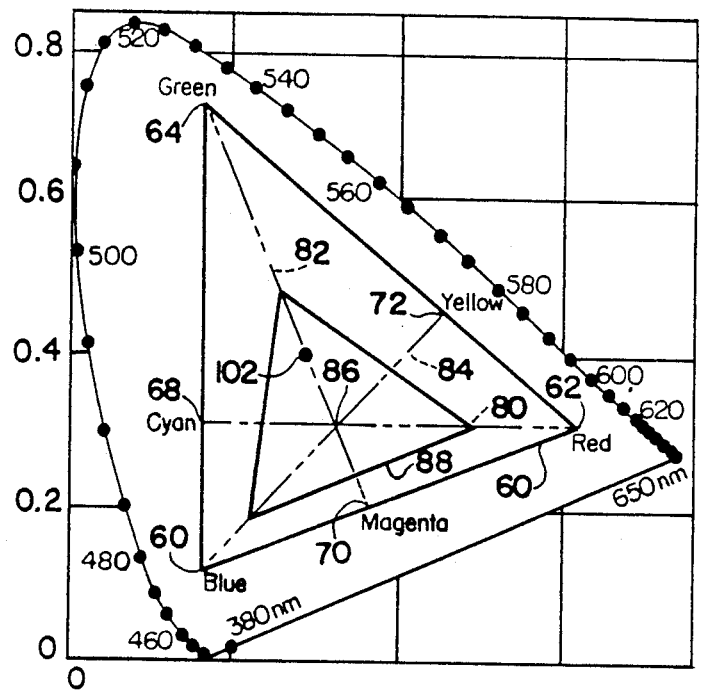
FIG. 10 is a representation of the C.I.E. color diagram, including representations of color extremes on respective triangles depicted within the color diagram.

The color operation of pel 14, for example, is described relative to the CIE chromaticity diagram of FIG. 10. Within the diagram are drawn a first triangle 60 having the colors red, green and blue at the respective corners 62, 64, 66 thereof and the respective complements cyan, magenta and yellow at respective intermediate locations 68, 70, 72 of the legs 74, 76, 78 of the triangle. Straight lines 80, 82, 84 are drawn between respective pairs of complementary colors, red and cyan connected by line 80, green and magental connected by line 82, and blue and yellow connected by line 84. Such lines 80, 82, 84 intersect at a central area of the chromaticity diagram, which represents white light having substantially equal amounts of all colors or of at least the three primary red, green and blue colors.

The color lines 80, 82, 84 represent the colors achievable as the primary color, say red at one end of the line 80, and the complementary color thereof, say cyan at the other end of line 80 are mixed in the optically subtractive/serial relation described herein. The intersection point 86 represents white. Any one of the color pairs, i.e. the color parts of any of the color subset portions 30, 32, 34, can be combined to produce white. Also, along any one of the color lines 80, 82, 84 a relative large range of colors can be produced. For example, the color pair green and magenta along the line 82 can give a large range of color.

The large triangle 60 represents the primary colors for pleochroic dyes that currently are available. The corners or points on such triangle represent the maximum color saturation for a given picture element 14. Thus, for example, the point 64 represents maximum green saturation and is achievable, as is described further below, when a given pel has the magenta color part in field on, substantially fully transmissive mode and all the other five color parts of the pel in field off, substantially filtering/absorbing mode.

A smaller triangle 88 is drawn within the larger triangle 60. The smaller triangle 88 represents the maximum brightness of light output by the display of the invention using a complementary color triad pel 14. The corners or points of such smaller triangle are designated 90, 92, 94, respectively representing bright blue, red or green colors. Such brighter colors are obtained due to the passage of a primary color light, say green, the green pleochroic dye color part and to the passage of light through the cyan and yellow color parts, as is described further below. The result is an increased amount of light being transmitted through the pel 14, although the actual green color saturation is reduced over that obtained using just the green/magenta complementary color pair or subset portion.

The triangle 60 represents all the hues that can be reproduced by additive mixing the three primary colors used in the present invention and obtained by subtractive operation in the individual complementary color pairs or subset portions 30, 32, 34 using the exemplary pleochroic dyes mentioned herein. It will be appreciated that the principles of the invention may be employed, too for other dyes. The smaller triangle represents the maximum intensity triangle; any color within the smaller triangle 88 can be represented by maximum brightness.

On the other hand, for a hand-held twisted nematic liquid crystal television the color triangle would be much smaller than the larger triangle 60; this is due to the fact that such liquid crystal television displays operate as color filters to achieve the desired color output. As a color filter, which separates the separate primary colors red, green and blue, for example, each of such color filters, then, only is capable of transmitting a maximum of one third the incident light when a particular color is desired, such as green; in such case the green color filter blocks the red and blue light components from a white input source and transmits only the green component—assuming the white light is comprised of equal parts of red, blue and green, only one third of the incident light is transmitted. Moreover, since the twisted nematic liquid crystal displays require polarizers, at least one half of the incident light is lost at the input or output polarizer; and this results in the maximum output for a given color being no greater than one sixth (one third times one half) the intensity of the incident light.

Since the present invention does not require polarizers, and since it is possible to get enhanced color operation, as is described further below, the present invention is capable of producing color output by a liquid crystal display at much greater efficiencies and at greater intensity for a given light input intensity than heretofor was possible.

In operation of the pel 14 and display 10 containing such pel, the eye of an observer ordinarily would integrate the color presented by a given pel, including the color presented by the several complementary color pairs 30, 32, 34 thereof; and the eye also would integrate the color of several pels. It is known, too, that the eye ordinarily does not integrate black and white in the way that it integrates color. According to the invention it is preferred to use three complementary color pairs in each pel to provide both intensity control and color control. Actually, each subset portion or complementary color pair 30, 32, 34 provides intensity control function; and the overall complementary color pair triad of the pel 14, for example, provides color control. Any one complementary color pair would be capable of providing a substantial two color system; and, then, adding the two additional complementary color pairs appreciably enhances operation for a multicolor system with both color and intensity/brightness control.

Looking at operation of only a single color part, such as the red color part 30a described above, in the absence of a prescribed input the pleochroic dye in the liquid crystal of such color part would transmit red light in response to white light input. Without the existence of the further color part 30b of the complementary color to red, namely cyan, gradual application of electric field to the color part 30a alone would increase the amount of green and blue in the output light and, thus, the amount of white in the output light. This may result in the creation of a pastel-like color. There would be no variation in the intensity of red light; only the saturation of the light would change.

It should be understood from the foregoing that the red pleochroic dye does not control the red light, but it does control the saturation. As field in increased, the amount of white light increases, and this changes the saturation.

On the other hand, according to the present invention, while the primary color, say red, is maintained at constant hue and saturation level, alteration of the complementary color, say cyan, in optical series/subtractive relation thereto can be used to alter the intensity of the light transmitted through the specified primary color liquid crystal color subset portion, for example. Specifically, since the complementary color may be considered a band rejection filter rejecting the band that ordinarily is passed by the subject primary color, true intensity control is possible without changing color.

Considering a particular liquid crystal color subset portion of pel 14, say subset portion 30, the actual color saturation or hue produced by the red dyed liquid crystal color part 30a can remain substantially constant, as the filtering by the complementary color (cyan) dyed liquid crystal color part 30b may be altered. Such alteration determines the quantity or intensity of red light transmitted through the color part 30b and, therefore, the intensity of the light transmitted through and output from the liquid crystal color part 30a. Thus, it will be seen that for a particular color, color saturation or hue of a primary color, the intensity of such primary color light may be varied as a function of the filtering accomplished by the complementary color liquid crystal volumes or color part, e.g. 30b.

A relatively saturated primary color may be obtained by leaving a respective primary liquid crystal color part, say 30a, in field off condition for maximum coloring of light and applying field to the respective complementary color liquid crystal color part 30b so that the latter color parts will transmit a maximum amount of light to the respective primary color parts. With the other two subset portions 32, 34, for example, maintained field off to provide black output, the total output of a pel including the just-mentioned liquid crystal color subset portions, i.e. three complementary color pairs, wiould be a hightly saturated, but not too bright primary color, namely red. Such red may be represented on the chromaticity diagram of FIG. 10 at point 62. Similar operation could be followed to obtain saturated green and blue colors of relatively low brightness.

Furthermore, the brightness, color saturation and hue of a particular pel can be even further controlled for a given primary color by using all three liquid crystal color subset portions of the pel to derive such color. For example, to achieve a bright green, the magenta liquid crystal volumes would be in full field on condition for maximum input to and transmission of light through the green liquid crystal volumes of respective color parts. Also, in the liquid crystal color subset portion including red and cyan color parts, the red would be turned on and the cyan would be turned field off to achieve maximum filtering of red light; however, since the cyan color is part blue and part green, the green part thereof further increases the amount of green through and, therefore, increases brightness of the output light. The same is true for the blue and yellow dyed color parts of the third color subset portion—the blue would be field on for minimum filtering and the yellow would be field off to achieve maximum filtering contributing some red and some green to the aforementioned primary green produced by the first mentioned color subset portion. In these examples, the brightness of output light is increased because more light is transmitted through the pel, buth the saturation of green light, for example, decreases somewhat due to the dilution by white light; such white light is formed by the blue and red components through the cyan and yellow filters 30b, 34b together with part of the green from the green filter 32a.

Still another operative example of the present invention to obtain a relatively pure or spectral green would be by turning to field off condition both liquid crystal color parts of the color subset portion 32; this avoids the presence of white light in the green as derived in the preceding two paragraphs. However, using the cyan and yellow dyed color parts of the two color subset portions 30, 34, respectively, in field off condition for maximum coloration (including green components as was described in the preceding paragraph) while maintaining the red and blue color parts thereof in field on condition to minimize the amount of red and blue in the final output light, a relatively subdued green color can be produced.

The present invention allows full gray scale output for each of the liquid crystal color subset portions 30, 32, 34. For example, by applying the same magnitude electric field to both of the color parts in a given subset portion, and/or by varying such field while maintaining the equal ratio, gray scale, and, importantly, variation in gray scale can be achieved. This, assumes that the concentration of dye in the complementary color pairs is the same. To determine what is happening as gray scale is obtained, one can follow the respective color lines 82, 84, 86; if the amount of filtering of red and cyan is the same, for example, then line 80 is followed in FIG. 10 to the center (white) point 86 at which varying shades of white, namely various grays, are obtained.

Another advantage of the present invention is that the liquid crystal color parts and, thus, the subset portions including the same, may be relatively thin. Therefore, parallax affects are substantially avoided. Therefore, when viewed, the two color parts of a subset portion appear as one layer or filter. The layers of volumes of liquid crystal and pleochroic dye in a containment medium forming respective liquid crystal color parts preferably are in intimate but non-mixing relation and are in optical serial relation. Moreover, even if a thin dividing electrode or two were placed between respective color parts, parallax still would be eliminated or substantially eliminated due to the optical serial arrangement of parts and the relative thinness thereof.

In view of the foregoing, it will be appreciated that the invention relies on the combination of two groups of volumes of liquid crystal and pleochroic dye in a containment medium to provide color output in a subtractive mode of operation. Such pleochroic dyes preferably are a primary color, e.g. working as a band pass filter, and the complement of such primary color, e.g. working as a band rejection filter to reject or to block passage of light in the wavelength ordinarily passed by the band pass filter. Such two groups of volumes may be included in a liquid crystal color subset portion of a pel 14 for a liquid crystal display 10; the other parts of such pel being formed by respective pairs of groups of volumes of primary and complementary color dyed liquid crystal material in a containment medium.

Several simplified and idealized examples of operation of the display 10 are presented below. In such examples it is assumed that the concentration and/or filtering ability for the dyes in the six respective color parts of the pel 14 are equal and that for a given field the same degree of filtering will occur for each color part albeit the colors filtered will be different.

EXAMPLE A

All six color parts 30a, 30b, 32a, 32b, 34a, 34b are full field on and fully or substantially fully transmissive with no or minimal filtering of light: The result is a rather bright white output that is of an intensity or brightness of about 80% of the incident light.

EXAMPLE B

All six color parts 30a, 30b, 32a, 32b, 34a, 34b are field off and, therefore, are fully or substantially fully absorbing or filtering light: The result is a rather bright white output that is a black output.

EXAMPLE C

Five of the color parts are field off and absorbing; the magenta color part is fully field on and not absorbing. By varying the field on the green, the amount of white included in the green can be controlled.

EXAMPLE D

Five of the color parts are absorbing; the magenta is not absorbing. The magenta then controls the brightness of the green.

EXAMPLE E

Magenta and green are controlled together to control the brightness and saturation of the green. If all other subset portions are absorbing and, therefore, black, and if the magenta and green are equal, then get a gray of varying intensity—gray scale. Moreover, if magenta and green are unequal, get differences in brightness and saturation of the green. In this same example, if the other subsets are transmitting the same type of operation as above occurs, but with much more white mixed in with the gray or with the bright pale green produced.

EXAMPLE F

Magenta transmitting (gives green), red transmitting and blue transmitting: This condition yields maximum brightness green. Due to the green contribution of the absorbing green color part 32a and due to the cyan and yellow color parts 30b, 34b, which contribute some green light with blue or some green light with red, respectively. The contribution of the red and blue reduces the effective saturation of the green and coact with part of the green to yeild white; and such white effectively increases the overall brightness.

According to this example, the green color part 32a alone yields the point 64 of the chart of FIG. 10. The contribution of the red and blue together with the added green brings the green down to about point 100 on the chart.

EXAMPLE G

Objective of this example is to obtain green using the cyan and yellow color parts 30b, 34b. With the green and magenta color parts absorbing black is produced; with the red and blue color parts transmitting the cyan and yellow color parts may be used to produce a green output light. With the cyan and yellow color parts absorbing green is produced with some blue and some red parts. Such blue and red parts cooperate with part of the green to yield white, and, therefore, the composite output of the pel 14 is a pale green.

The following numerical example for Example G is indicative of operation according to the preceding examples. Say, for example, that input light is provided to all three color subset portions 30, 32, 34. With the green and magenta absorbing they have no contribution. The cyan filter 30b (and transmissive red filter) produce light output that has $\frac{1}{3}$ green light and $\frac{1}{3}$ blue light, but no red component. The yellow filter 34b (and transmissive blue filter) produce light output that has $\frac{1}{3}$ green light and $\frac{1}{3}$ red light, but no blue component. Adding the respective components yields $\frac{2}{3}$ green, $\frac{1}{3}$ blue and $\frac{1}{3}$ red. The equivalent is $\frac{1}{3}$ green together with $\frac{1}{3}$ white. The fractions noted here are fractional amounts of the input white light to a given subset portion, that amount of input white light being 1 or 3/3. The just mentioned example provides a green output with low saturation, i.e. a pale green.

From the foregoing it will be appreciated that the present invention provides the possibility to obtain a wide variety of output light colors and gray scale, with bright whites and dark blacks, and there are numerous ways in which a given color can be obtained. The best saturation is obtained using only the subset part of that color, e.g. green, with the two other complementary color pairs absorbing to produce black. The hightest intensity or brightness is achieved with the green and with the cyan and yellow filters also contributing, as was described above.

Figure 14:
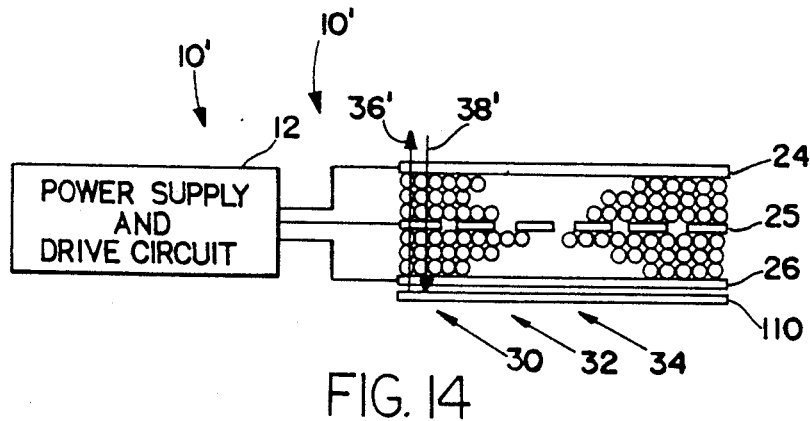
FIG. 14 is a schematic side elevation view of an alternate embodiment of the invention, including a pair of picture elements, including the color subsets thereof, in accordance with the display of FIG. 1.

Importantly, it will be realized that the invention may be employed with a reflector 110 to provide reflective operation relying on ambient light or light from the viewing side to produce the light input for the device. This is contrasted from the embodiment in which incident light 36 (FIG. 2) is provided from a separate light source on the opposite side of the viewing side. Such reflector is seen in FIG. 14. Moreover, in FIG. 14, an intermediate electrode 25 is shown between the two separate layers that form the color parts. Thus, in the top layer 112 may be formed the color parts 30a, 32a, 34a; and in the lower layer 114 are the color parts 30b, 32b, 34b. The intermediate electrode 25 is shared with the electrodes 24, 26 to complete application of electric field to the liquid crystal display 10, of FIG. 14. Such embodiment 10' is disclosed generally in further detail in the above-mentioned copending application.

Figure 13:
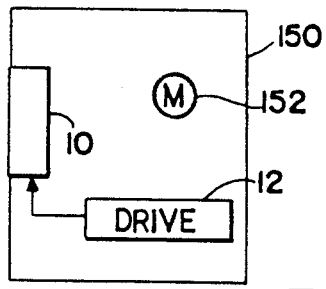
FIG. 13 is a schematic elevation view of a multicolor television display using the principles of the present invention.

Turning briefly to FIG. 13, a color television 150 is illustrated using the display 10 and drive circuit 12, for example, as was described above. In response to input light (white light preferably) from the source 152, the display 10 and circuit 12 can produce multicolor output pictures, images, etc. using the controlled filters concepts and especially the liquid crystal concepts described in detail above.

The use of at least one cross-over liquid crystal material is another way to effect discrimination as a function of frequency and voltage of electric field applied by a single pair of electrodes.

Cross-over Liquid Crystal Material

A cross-over liquid crystal material is one that has a characteristic that changes as a function of input. For example, in the preferred embodiment, the liquid crystal material may have two different dielectric anisotropies-one dielectric anisotropy, e.g. positive, at one frequency (say at a low frequency) of applied electric field and a second different dielectric anisotropy, e.g. negative, at a different frequency (say at a high frequency). Therefore, at different frequencies of electric field one can obtain different respective operation of the liquid crystal, such as selective switching from the same liquid crystal material. Exemplary cross-over liquid crystal materials that are operationally nematic are, as follows:

TABLE 4

1. ZL1-2461, ZL1-2978, or TX-2A, all by E. Merck
2. KOD-M, (a mixture of 50% p-octylphenyl 2-chloro-4-(ppentyl benzoate +50% p-phentyl (phenyl 2-chloro-4-(p-pentyl benzoyloxy) benzoate)))
3. 3333, 3421, by Hoffman LaRoche Several properties of ZL1-2461 nematic type liquid crystal material include the following: Dielectric anisotropy, delta E (E is dielectric coefficient because E may change as a function of direction with respect to the alignment of the liquid crystal, i.e. structure orientation of the liquid crystal, frequency, etc.), at low frequency, e.g. below about 3 KHz at room ambient temperature, is +3. In particular, $E_{parallel}$ is 7.8, and $E_{perpendicular}$ is 4.8 (parallel and perpendicular refer to ordinary and extraordinary directional considerations relative to alignment of the axis of the liquid crystal structure). Switch over frequency is 3 KHz at room ambient temperature. Switch over frequency is that frequency of the applied electric field at which the dielectric anisotropy of the cross-over liquid crystal material changes from positive to negative and vice versa. Dielectric anisotropy at the relatively higher frequency of 10 KHz is −1.5. Optical anisotropy is relatively low, namely, delta N=0.13. (N is the index of refraction, and delta N is the difference between the ordinary index of refraction and the extraordinary index of refraction of the liquid crystal material.) Therefore, such 2461 material has relatively low birefringence. The 2461 liquid crystal is compatible with several other liquid crystal materials. Such compatibility is manifest in the following operative example.

Combination/compatibility of cross-over liquid crystal with other liquid crystal materials: It is not critical which of the above recipes (Table I, for example) of liquid crystal materials is used with the cross-over material. For assuring turn on at the same time at low frequency, one must use liquid crystal material that has a dielectric anisotropy which is about the same as the low frequency dielectric anisotropy as that of the 2461 liquid crystal material. For example, 10% cyano and 2461 liquid crystal materials may be used. Another example would be 2461 material and 2116-110 liquid crystal material, also by Merck. All the delta N's (optical anisotropy——N is index of refraction) and delta E's match for these except that the 2461 turns off at high frequency or does not switch at high frequency because at high frequency the 2461 liquid crystal material has negative dielectric anisotropy.

It also is contemplated to use two or more different liquid crystal materials that have different cross-over frequencies. Therefore, it would be possible to obtain discrimination at more than one frequency. Using one of such liquid crystal materials in one group of volumes and another in another group, the liquid crystal materials preferably would not mix. Examples of such liquid crystal materials useful according to this arrangement are 3421 by Roche that has a low cross-over frequency of about 400 Hz. and 3333 liquid crystal by Roche that has a relatively higher cross over frequency of 3.2 KHz.

CAPSULE SIZE CONSIDERATIONS

Capsule size can play an important role in accomplishing voltage discrimination function for the several layers of encapsulated liquid crystal material. The smaller the capsule, for a given liquid crystal material, the larger the voltage required to switch the liquid crystal material to aligned state. Accordingly, the same liquid crystal material can be used in each of the liquid crystal layers, but each layer is formed of capsules of different respective size. In this way voltage discrimination can be accomplished with the same liquid crystal.

The above described volume/capsule size considerations, as well as the various other features of the invention may be used together to achieve the particular operational characteristics of multicolor subtractive color or serial filtering accomplished in the multicolor optical devices of the invention as are described in detail above.

Thus, it will be appreciated that using the above materials, it is possible to address different colors in a multicolor liquid crystal display using encapsulated liquid crystal materials.

EXAMPLE 6

In this example both voltage and frequency are used to discriminate the input to a pair of different liquid crystal materials. Moreover, in this example one of the dyes actually cannot be encapsulated with the Gantrez according to the method described above with the cross-linking to obtain isolating capsules, because the dye contains alcohol and would react with the Gantrez.

Materials: Separate layers of encapsulated liquid crystal material, each having a different color pleochroic dye therein. Referring to FIG. 3 for this example, layer 30a has red pleochroic dye and is formed of the 5% organo liquid crystal material identified above. Layer 30b has cyan pleochroic dye therein and is formed of 2461 liquid crystal which is frequency dependent, vis-a-vis dielectric anisotropy. The threshold level of the 5% cyano liquid crystal material to turn on/align with respect to the field exceeds that of the 2461 liquid crystal (at low frequency).

Operation: When no field is applied, both layers 30a and 30b are field-off and for incident white light input the output is dark or black. In response to an input electrical field of low voltage and low frequency, the 2461 layer turns on (liquid crystal aligns) and dye therein becomes effectively transparent, while the dye in the 5% material layer continues filtering to produce a red output. At high voltage and low frequency, the 5% material turns on and the 2461 material stays on, whereupon the display is clear. At low voltage, high frequency, the 2461 material turns off and the 5% material stays on, whereupon the display produces a cyan output.

Advantages of such voltage/frequency discrimination by the liquid crystal material itself is that no intermediate electrode is required; absorption caused by such electrode is eliminated. Also, only two electrical terminals would be required for the multicolor device and only one single cast may be required to make the device.

Using exclusively the above-described cross-linked capsules, and consistent with the several examples described herein, a first layer of one color dyed encapsulated liquid crystal material could be cast on a support, followed by a second layer of a different color dyed encapsulated liquid crystal material, and, if desired, even a third, etc. Each liquid crystal material may be responsive to a different voltage or frequency than the other(s) to achieve discrimination of input field to produce a multicolor output. It also would be possible to mix the differently colored capsules of the isolating cross-linked type to achieve a homogeneous mixture of distribution thereon. Such mixture, which would be responsive to or discriminating with respect to different switching voltages or frequencies, could be used to achieve the desired multicolor response using only a single pair of electrodes.

BALANCING ELECTRICAL CHARACTERISTICS

While, on the one hand, it is desirable to achieve the above-mentioned electric field discriminating function, on the other hand it is desirable to balance the electrical characteristics of the liquid crystal layers. In particular, it would be desirable to balance electrical impedance of the layers so that for a given input field the voltage drop across each layer would be at least about the same. Such balance facilitates operational consideration as each layer or capsule discriminates the applied electric field. Although it is possible for a multicolor display to function with electrically unbalanced characteristics, the achieving of desired balance simplifies construction and operation of the display. Such balancing also may facilitate the discrimination function and may prevent possible damage to the liquid crystal material and/or containment medium due to overdriving by excessive voltage to switch one or both layers of an electrically unbalanced display.

To accomplish electrical balancing of plural liquid color layers, it may be necessary for the layers to be different thicknesses because the dielectric constants/-coefficients of the different liquid crystal materials often are different. However, as one layer is made proportionally thicker than another, compensation of dye concentration, namely a reduction in dye concentration in a given layer as it is made thicker, is desirable to maintain substantial balance in the color filtering effects of the respective layers. Such balancing of dye concentration may be according to an equation for intensity I of light transmitted through a liquid crystal layer containing pleochroic dye as a function of the incident light intensity $I_0$, thickness T of the layer, and concentration B of the dye in that layer, as follows:

$$I = I_0 e^{-BT}.$$

If desired, although more complex, the filtering effect of the respective layers 2, 3 and the electrical considerations could be unbalanced, e.g. by having the layers of equal thickness with dyes of the same or different concentration, etc.

Concentration of the dye plays a big part in balancing out the absorption characteristics of the materials used and of the resulting color output. These can be determined pragmatically, if desired. Importantly, though, the electrical characteristics of the layers are balanced to facilitate application of electric field and determination of the discrimination and/or other operational functions of the multicolor display device according to the invention.

The power supply and drive circuit may be of the type that produces electrical signals useful in a matrix addressing/multiplex scheme selectively to cause or not to cause responsive parallel alignment of liquid crystal structure in respective volumes of liquid crystal material. Examples of such electrical signals and liquid crystal driving technique are disclosed in the following published articles: Paul R. Gerber, "Two-Frequency addressing of a Cholesteric Texture Change Electro-Optical Effect", *Applied Physics Letters*, Vol. 44, No. 9, May, 1984, pages 932–934; and van Doorn et al. "Two-Frequency 100Line Addressing of a Reflective Twisted-Nematic Liquid-Crystal Matrix Display", *Journal of Applied Physics*, Vol 50, No. 2, February, 1979, pages 1066–1070. The entire disclosures of such articles hereby are incorporated by reference.

Figure 11:
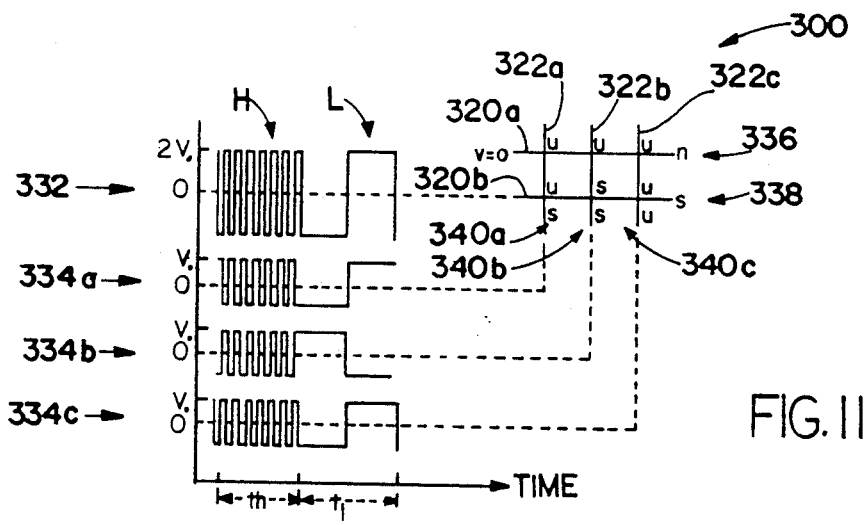
FIG. 11 is a representation of the signals produced by a drive circuit useful in accordance with the invention taking advantage of frequency discrimination by the liquid crystal material.

Using the driving schemes disclosed by van Doorn et al and by Gerber, various low frequency and high frequency signal portions of controlled amplitude, for example as a function of actual power supply amplitude and/or phase relation of signals, can be generated to effect the desired responsive alignment or not of liquid crystal structure in respective volumes of liquid crystal material in the liquid crystal device 10 (FIG. 1), 300 (Fig. 11).

Figure 12:
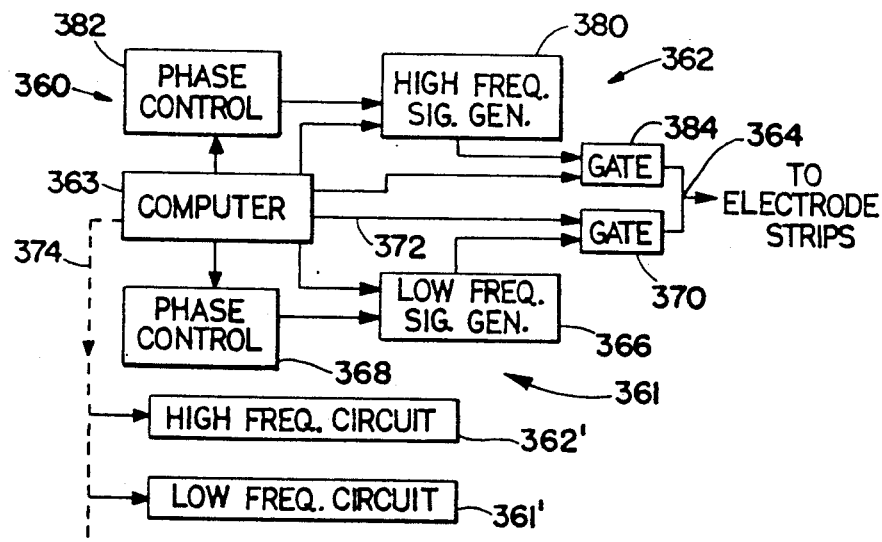
FIG. 12 is a schematic diagram of a circuit for driving a liquid crystal device in accordance with the invention.

In FIG. 12 are illustrated a number of voltage waveforms used according to the matrix-addressing technique of Gerber. Voltage waveform 332 has an amplitude of $2V_0$; and the voltage waveforms 334a, 334b, 334c have an amplitude of $V_0$. Such voltage waveforms have both high frequency portions generally designated H and relatively low frequency portions generally designated L. The period of high frequency portion H of each waveform, i.e. the total time during which the high frequency portion is produced, and the voltage amplitude $V_O$ and $2V_O$ are selected such that application of the voltage by a single one of such signals for that period or duration would not cause a change in the alignment of liquid crystal structure; and the same is true for the relationship of the voltage $V_O$ and period or duration of the low frequency portion L of each voltage waveforms 332 and 334. The difference between the voltage waveforms 334a, 334b, 334c is in the phase relationship of the respective high and low frequency portions thereof to the phases of the high and low frequency portions of the waveform 332. Thus, the high frequency portion of waveform 334a is 180° out of phase or phase reversed relative to the phase of the high frequency portion of the waveform 332; the low frequency portions of the waveforms or signals 334a, 332 are in phase. The high frequency portions of the signals 334b and 332 are in phase; and the low frequency portions thereof are phase reversed, i.e. 180° out of phase. The high frequency portion of the signals 334c, 332 are in phase, and the low frequency portions thereof also are in phase.

In FIG. 11 reference numeral 336 represents a row of pixels (for example three subsets of a pel 14) of the device 300, for example along the electrode strip 320a, that are unswitched due the fact that no signal 332 is applied thereto. Such non-selected row is depicted at 336 with a plurality of unswitched pixel elements designated by the letter "u". The device 300 and, accordingly, the line 336 may include more than the representatively depicted three pixels. Although one of the signals 334 may be applied to one or more of the respective electrode strips of the electrode 322 that align with the electrode strip 320a of the pixel row 336, as was mentioned above, the amplitude of the voltage 334 alone and the duration of the respective portions thereof preferably are inadequate to effect switching or alignment of liquid crystal structure with respect to electric field between respective electrode strips.

Reference numeral 338 in FIG. 11 represents a row of pixels of the device 300 to which the signal 332 is applied, for example the row of pixels aligned with the electrode strip 320b. Signals 334a, 334b, 334c may be delivered to respective electrode strips 322a, 322b, 322c, for example. Pixels 340a, 340b, 340c of the device 300 are the ones represented in line 338 of FIG. 11.

At pixel 340a the high frequency portions of the signals 32, 334a are out of phase; therefore, a high frequency voltage having an effective amplitude of $3V_0$ is applied to the pixel 340a. The amplitude $3V_0$ is adequate to align the structure of the non-cross over liquid crystal material in one group of volumes with respect to the applied electric field, thereby to minimize, preferably as close to zero as possible, any color filtering by such liquid crystal (and pleochroic dye contained therein). Thus, at pixel 340a in row 338 of FIG. 11 the lower portion of such pixel is designated with a letter "s" indicating that such non-cross over liquid crystal material is switched to alignment. However, the frequency of such high frequency signal is above the cross over frequency of the cross over liquid crystal material in another group of volumes, and, therefore, the structure of such liquid crystal and the pleochroic dye therein will align normal to the applied field (the liquid crystal then having negative dielectric anisotropy) or, in any event, generally will not be parallel to such field. Therefore, the result of such volumes of cross over liquid crystal material and pleochroic dye therein will be to cause color filtering or coloring of light transmitted therethrough. A letter "u" at pixel 340a in row 338 of FIG. 11 indicates the unswitched or in any event color filtering status of the cross over liquid crystal material of the pixel.

With the foregoing in mind, it will be appreciated that when the signal waveform 332 is applied to an electrode strip, say strip 320b, and signal waveform 334b is applied to an electrode strip, such as strip 322b, both the cross over and non-cross over liquid crystal materials in volumes will be switched to align with the applied electric field. Such alignment is effected because the high frequency portions of the applied signals are in phase and, therefore, have a net amplitude of $2V_0$, which is too small to effect alignment or dielectric anisotropy cross over. On the other hand, the low frequency portions of the applied signal voltages are frequency shifted relative to each other so that they are 180° out of phase and apply a net low frequency voltage equal to $3V_0$. Accordingly, pixel 340b provides minimal filtering, preferably no filtering, of light transmitted therethrough. Therefore, on line 338 in FIG. 11, both liquid crystal materials are shown being switched, these conditions being represented by the letter "s". At pixel 340c represented in line 338 of FIG. 11, the liquid crystal materials in respective volumes of such pixel are unswitched and effect filtering of light transmitted therethrough as a function of the pleochroic dye in the respective liquid crystal materials because the voltage waveform 334c (for example applied to electrode strip 322c) has both high and low frequency portions that are in phase with the respective high and low frequency portions of the voltage waveform 332 applied to electrode strip 320b.

The foregoing description relative to FIG. 11 is presented by way of example to demonstrate one form of two-frequency matrix addressing technique to effect operation of the liquid crystal device. A particular advantage to the frequency shifting technique described is that the voltage waveforms, for example 332, 334, may be of the type that are computer generated and/or computer controlled to achieve the desired frequencies and/or amplitudes and, importantly, phase relationships. Additionally, a further superimposed steady low-frequency voltage may be applied, as is described in the van Doorn et al article mentioned above. Further, one or more of the signals 332, 334 may be turned on and off, and the responsive alignment of the one of the liquid crystal materials, e.g. the cross over type, may be below that of such signal, thus enabling either liquid crystal material or both to be brought into responsive alignment (reduced color filtering), as is described generally above.

An exemplary circuit 360 in FIG. 12 may be used to develop the two-frequency signals of the articles mentioned above, for example with reference to the liquid crystal devices. The circuit 360 may be included as part of the power supply and drive curcuits 330, 330', 330" to generate each signal applied to a respective electrode 320, 322, 324, and so on.

In circuit 360 there are low and high frequency circuit portions 361, 362, and a computer 363 controls signal generation and/or phase of each signal as well as the time during which a given signal is delivered to a respective electrode. Although not shown, a further multiplex circuit of conventional design may be used under control of the computer 363 selectively to couple the signal output on output line 364 to respective electrode strips.

In the low frequency portion 361 of circuit 360 a low frequency signal generator 366, such as a free running multivibrator, produces a low frequency signal of from several to several thousand Hz. The frequency is below cross-over frequency of liquid crystal material that may be used in a given display 300, for example. The relative phase of such signal is determined by the phase control circuit 368 as determined by the computer 363. The low frequency signal produced by the low frequency signal generator 366 is provided to a gate circuit 370 which passes such signal to output 364 when selected by a signal on line 372 from the computer.

Dotted line 374 indicates that the computer 363 may be coupled to one or more other low frequency circuit 361', which include(s) phase control, low frequency signal generator and gate to develop another low frequency signal for delivery, say, to another electrode of a liquid crystal device 300. For example, the low frequency signal on output 364 may be coupled to one of the strips of electrode 320 (FIG. 21) and the output from the other low frequency circuit may be coupled to a strip of electrode 322. Depending on the phase relation of such signals responsive alignment of liquid crystal material can be affected, as was described above.

The high frequency circuit portion 362 of circuit 360 includes a high frequency signal generator 380, phase control 92, and gate 384. The high frequency portion is controlled by the computer 363, as is the low frequency portion, selectively to produce a relatively high frequency signal of a given phase on output 364. The high frequency preferably is above the cross over frequency of cross over liquid crystal material used in the display 300, for example. Line 374 represents connection to another high frequency circuit portion 362' under control of computer 363 to develop a similar high frequency signal, for example. The respective high frequency signals may be coupled to respective electrodes or electrode strips and may be controlled to have a particular phase relation to determine responsive alignment of liquid crystal structure generally as was described above.

STATEMENT OF INDUSTRIAL APPLICATION

In view of the foregoing, it will be appreciated that the present invention provides means for displaying color outputs and/or black and white using controllable filters, in the preferred embodiment, liquid crystal filters, and especially providing parametric control of color using liquid crystal and dye.

I claim:

1. A method for producing a light output, comprising directing light to a plurality of color aligned in optical series, wherein a first one of such filters has one color characteristic and a second one of such filters has the complementary color characteristic, and controlling the amount of filtering by at least one of such filters, whereby such light output has characteristics that are a function of the filtering of both such first and second filters.

2. The method of claim 1, said controlling comprising controlling the filtering of such second filter to determine the brightness of such output light without substantially affecting the hue of such output light.

3. The method of claim 1, said controlling comprising controlling the filtering of such first filter to determine the hue of such output light without substantially affecting the brightness of such output light.

4. The method of claim 1, said controlling comprising controlling the filtering of both filters to determine both the hue and brightness of such output light.

5. The method of claim 4, wherein such plurality of filters comprises two filters in optical series forming a first color subset and wherein there is positioned in proximity to such first color subset a second color subset including a second plurality of color filters aligned in optical series, wherein a first one of such second plurality of filters has one color characteristic different from the color characteristic of such first filter of such first plurality of filters and a second one of such second plurality of filters has the complementary color characteristic, said directing comprising directing light to both of such color subsets to provide additive color function.

6. The method of claim 5, wherein a third color subset having one color filter and a complementary color filter is positioned in proximity of such first and second color subsets, and said directing comprising directing light to all three color subsets.

7. The method of claim 6, further comprising selecting the first color filter of each of such color subsets to be, respectively, red, green and blue.

8. The method of claim 1, wherein such plurality of filters comprises two filters in optical series forming a first color subset and wherein there is positioned in proximity to such first color subset a second color subset including a second plurality of color filters aligned in optical series, wherein a first one of such second plurality of filters has one color characteristic different from the color characteristic of such first filter of such first plurality of filters and a second one of such second plurality of filters has the complementary color characteristic, said directing comprising directing light to both of such color subsets to provide additive color function.

9. Apparatus for producing a light output, comprising means for directing light to a plurality of color filters aligned in optical series, said plurality of color filters including a first filter having one color characteristic and a second filter having the complementary color characteristic, and means for controlling the amount of filtering by at least one of said filters, whereby such light output has characteristics that are a function of the filtering of both said first and second filters.

10. The apparatus of claim 9, said means for controlling comprising means for controlling the filtering of said second filter to determine the brightness of such output light without substantially affecting the hue of such output light.

11. The apparatus of claim 9, said means for controlling comprising means for controlling the filtering of said first filter to determine the hue of such output light without substantially affecting the brightness of such output light.

12. The apparatus of claim 9, said means for controlling comprising means for controlling the filtering of both filters to determine both the hue and brightness of such output light.

13. The apparatus of claim 12, wherein said plurality of filters comprises two filters in optical series forming a first color subset, the apparatus further comprising positioned in proximity to said first color subset a second color subset including s second plurality of color filters aligned in optical series, wherein a first one of said second plurality of filters has one color characteristic different from the color characteristic of said first filter of said first plurality of filters and a second one of said second plurality of filters has the complementary color characteristic, said means for directing comprising means for directing light to both of said color subsets to provide additive color function.

14. The apparatus of claim 13, further comprising a third color subset having one color filter and a complementary color filter positioned in proximity of said first and second color subsets, and said directing means comprises means for directing light to all three color subsets.

15. The apparatus of claim 14, further comprising means for selecting the first color filter of each of such color subsets to be, respectively, red, green and blue.

16. The apparatus of claim 9, wherein said plurality of filters comprises two filters in optical series forming a first color subset and the apparatus further comprising positioned in proximity to said first color subset a second color subset including a second plurality of color filters aligned in optical series, and wherein a first one of said second plurality of filters has one color characteristic different from the color characteristic of said filter of said first plurality of filters and a second one of said second plurality of filters has the complementary color characteristic, and wherein said directing means comprises means for directing light to both of said color subsets to provide additive color function.

* * * * *